(12) United States Patent
Wu et al.

(10) Patent No.: US 11,818,033 B2
(45) Date of Patent: Nov. 14, 2023

(54) COLLECTIVE COMMUNICATION METHOD, APPARATUS, AND SYSTEM

(71) Applicant: HUAWEI TECHNOLOGIES CO., LTD., Guangdong (CN)

(72) Inventors: Tao Wu, Nanjing (CN); Jian Yan, Nanjing (CN); Xitong Jia, Nanjing (CN); Heyang Liu, Nanjing (CN); Fei Chen, Nanjing (CA); Xiangyu Gong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/540,254

(22) Filed: Dec. 2, 2021

(65) Prior Publication Data

US 2022/0094625 A1    Mar. 24, 2022

Related U.S. Application Data

(63) Continuation of application No. PCT/CN2020/092304, filed on May 26, 2020.

(30) Foreign Application Priority Data

Jun. 4, 2019    (CN) .......................... 201910481166.2

(51) Int. Cl.
*H04L 45/128* (2022.01)
*H04L 12/18* (2006.01)
(Continued)

(52) U.S. Cl.
CPC ........ *H04L 45/128* (2013.01); *H04L 12/1854* (2013.01); *H04L 45/44* (2013.01); *H04L 69/166* (2013.01)

(58) Field of Classification Search
CPC ... H04L 45/128; H04L 12/1854; H04L 45/44; H04L 69/166
See application file for complete search history.

(56) References Cited

U.S. PATENT DOCUMENTS

| 6,831,898 B1 | 12/2004 | Edsall et al. |
| 8,266,204 B2 | 9/2012 | Bansal et al. |
| 2009/0059934 A1* | 3/2009 | Aggarwal ............. H04L 12/462 370/401 |

FOREIGN PATENT DOCUMENTS

| CN | 1988706 A | 6/2007 |
| CN | 101044723 A | 9/2007 |

(Continued)

OTHER PUBLICATIONS

Ernie Chan et al., "Collective communication theory, practice, and experience", Jul. 5, 2007, total:35pages.
(Continued)

*Primary Examiner* — Duc C Ho
(74) *Attorney, Agent, or Firm* — HUAWEI TECHNOLOGIES CO., LTD.

(57) ABSTRACT

Embodiments of this application disclose a collective communication method, apparatus, and system. The method includes: A first network device receives a first packet; the first network device receives at least one second packet; and the first network device sends a third packet based on the first packet and the at least one second packet. When no connection is established between the first network device and a terminal device, the first network device may aggregate and distribute collective communication packets by using a connection between the first terminal device and another terminal device.

20 Claims, 17 Drawing Sheets

(51) Int. Cl.
*H04L 45/44* (2022.01)
*H04L 69/166* (2022.01)

(56) References Cited

FOREIGN PATENT DOCUMENTS

| CN | 108011824 A | 5/2018 | |
|---|---|---|---|
| CN | 108989218 A | 12/2018 | |
| CN | 109561021 A | 4/2019 | |
| CN | 109644186 A | 4/2019 | |
| CN | 109691039 A | 4/2019 | |
| CN | 110431776 A | 11/2019 | |
| WO | 2017088557 A1 | 6/2017 | |
| WO | 2019057199 A1 | 3/2019 | |
| WO | WO-2019091456 A1 * | 5/2019 | ............. H04L 29/06 |

OTHER PUBLICATIONS

Fabrizio Petrini et al., "Hardware- and Software-Based Collective on the Quadrics NetworkCommunication", 2001 IEEE, total:12pages.

* cited by examiner

COLLECTIVE COMMUNICATION METHOD, APPARATUS, AND SYSTEM

CROSS-REFERENCE TO RELATED APPLICATIONS

This application is a continuation of International Application No. PCT/CN2020/092304, filed on May 26, 2020, which claims priority to Chinese Patent Application No. 201910481166.2, filed on Jun. 4, 2019. The disclosures of the aforementioned applications are hereby incorporated by reference in their entireties.

TECHNICAL FIELD

Embodiments of this application relate to the field of communications technologies, and more specifically, to a collective communication method, apparatus, and system.

BACKGROUND

Collective communication refers to a communication mode in which all processes in a specific group participate. Collective communication includes global reduction, broadcast, synchronization, and the like.

In an existing collective communication method, a connection needs to be established between a network device and a terminal device. When the terminal device needs to send a collective communication packet to the network device, the terminal device constructs the collective communication packet by using the connection established between the terminal device and the network device, and then the terminal device sends the constructed collective communication packet to the network device. Similarly, when the network device needs to send a collective communication packet to the terminal device, the network device constructs the collective communication packet by using the connection established between the network device and the terminal device, and then the network device sends the constructed collective communication packet to the terminal device.

It may be learned from the existing collective communication method that to establish a connection between the network device and the terminal device, a hardware module for establishing a connection to the terminal device needs to be disposed on the network device. This increases hardware investment of the network device. In addition, the network device needs to use a state machine to maintain a state of connection established between the network device and the terminal device, resulting in increased resource overheads of the network device.

SUMMARY

Embodiments of this application provide a collective communication method, apparatus, and system. When no connection is established between a network device and a terminal device, the network device may aggregate and distribute collective communication packets by using a connection between terminal devices.

The embodiments of this application include the following implementations.

According to a first aspect, an embodiment of this application provides a collective communication method. The method includes: A first network device receives a first packet, where the first packet includes a first collective communication identifier and a first destination address, and the first destination address is an address of a first terminal device; the first network device receives at least one second packet, where each of the at least one second packet includes the first collective communication identifier; and the first network device sends a third packet based on the first packet and the at least one second packet, where the third packet includes the first collective communication identifier and the first destination address.

In the first aspect, when no connection is established between the first network device and the first terminal device, the first network device may aggregate and distribute collective communication packets by using a connection between the first terminal device and another terminal device. Therefore, the first network device does not need to include a hardware module for establishing a connection to the terminal device, and this reduces hardware investment of the first network device. In addition, the first network device does not need to use a state machine to maintain a state of connection established between the first network device and the terminal device. This reduces resource overheads of the first network device.

In a possible implementation, that the first network device sends a third packet based on the first packet and the at least one second packet includes: The first network device generates the third packet based on a payload of the second packet and a packet header of the first packet, where the second packet is a packet sent by a second network device; and the first network device sends the third packet.

The first network device may generate the third packet based on the payload of the second packet and the packet header of the first packet. Therefore, the first network device does not need to construct the third packet.

In a possible implementation, after the first network device receives the first packet and before the first network device receives the at least one second packet, the method further includes: The first network device determines that there is one terminal device in a local communication group corresponding to the first collective communication identifier; the first network device extracts a payload of the first packet to obtain first data; and the first network device sends the first data and the first collective communication identifier to the second network device.

When there is one terminal device in the local communication group corresponding to the first collective communication identifier, the first network device may extract only the payload of the first packet to obtain the first data, and then send the first data and the first collective communication identifier to the second network device.

In a possible implementation, after the first network device receives the first packet and before the first network device receives the at least one second packet, the method further includes: The first network device determines that there are at least two terminal devices in a local communication group corresponding to the first collective communication identifier; the first network device receives at least one fourth packet, where each of the at least one fourth packet includes the first collective communication identifier, and the first packet and the at least one fourth packet are packets sent by all terminal devices in the local communication group corresponding to the first collective communication identifier; the first network device aggregates a payload of the first packet and a payload of the at least one fourth packet to obtain second data; and the first network device sends the second data and the first collective communication identifier to the second network device.

When there are at least two terminal devices in the local communication group corresponding to the first collective communication identifier, the first network device may aggregate the payload of the first packet and the payload of the at least one fourth packet to obtain the second data, and then send the second data and the first collective communication identifier to the second network device.

In a possible implementation, the first network device determines that a collective communication type of the first packet is global reduction or broadcast; and the first network device determines that a quantity of terminal devices in the local communication group corresponding to the first collective communication identifier is less than a quantity of terminal devices in a global communication group corresponding to the first collective communication identifier.

In a possible implementation, that the first network device sends a third packet based on the first packet and the at least one second packet includes: The first network device determines that the first packet and the at least one second packet are packets sent by all terminal devices in a local communication group corresponding to the first collective communication identifier; the first network device aggregates a payload of the first packet and a payload of the at least one second packet to obtain third data; the first network device generates the third packet based on the third data and a packet header of the first packet; and the first network device sends the third packet.

The first network device may generate the third packet based on the third data and the packet header of the first packet. Therefore, the first network device does not need to construct the third packet.

In a possible implementation, the first network device determines that a collective communication type of the first packet is global reduction or broadcast; and the first network device determines that a quantity of terminal devices in the local communication group corresponding to the first collective communication identifier is equal to a quantity of terminal devices in a global communication group corresponding to the first collective communication identifier.

In a possible implementation, that the first network device sends a third packet based on the first packet and the at least one second packet includes: The first network device determines that the first collective communication identifier in the second packet is the same as the first collective communication identifier in the first packet, where the second packet is a packet sent by a second network device; and the first network device sends the third packet, where a payload of the third packet is the same as a payload of the first packet.

The first network device may generate the third packet, and the payload of the third packet is the same as the payload of the first packet. Therefore, the first network device does not need to construct the third packet.

In a possible implementation, after the first network device receives the first packet and before the first network device receives the at least one second packet, the method further includes: The first network device determines that there is one terminal device in a local communication group corresponding to the first collective communication identifier; and the first network device sends the first collective communication identifier to the second network device.

When there is one terminal device in the local communication group corresponding to the first collective communication identifier, the first network device may send only the first collective communication identifier to the second network device.

In a possible implementation, after the first network device receives the first packet and before the first network device receives the at least one second packet, the method further includes: The first network device determines that there are at least two terminal devices in a local communication group corresponding to the first collective communication identifier; the first network device receives at least one fifth packet, where each of the at least one fifth packet includes the first collective communication identifier, and the first packet and the at least one fifth packet are packets sent by all terminal devices in the local communication group corresponding to the first collective communication identifier; and the first network device sends the first collective communication identifier to the second network device.

When there are at least two terminal devices in the local communication group corresponding to the first collective communication identifier, the first network device may send the first collective communication identifier to the second network device.

In a possible implementation, the method further includes: The first network device determines that a collective communication type of the first packet is synchronization; and the first network device determines that a quantity of terminal devices in the local communication group corresponding to the first collective communication identifier is less than a quantity of terminal devices in a global communication group corresponding to the first collective communication identifier.

In a possible implementation, that the first network device sends a third packet based on the first packet and the at least one second packet includes: The first network device determines that the first packet and the at least one second packet are packets sent by all terminal devices in a local communication group corresponding to the first collective communication identifier; and the first network device sends the third packet, where a payload of the third packet is the same as a payload of the first packet.

The first network device may generate the third packet, and the payload of the third packet is the same as the payload of the first packet. Therefore, the first network device does not need to construct the third packet.

In a possible implementation, the method further includes: The first network device determines that a collective communication type of the first packet is synchronization; and the first network device determines that a quantity of terminal devices in the local communication group corresponding to the first collective communication identifier is equal to a quantity of terminal devices in a global communication group corresponding to the first collective communication identifier.

In a possible implementation, when the first network device determines that the collective communication type of the first packet is global reduction, the payload of the first packet is different from a payload of the third packet, and a check value of the first packet is different from a check value of the third packet; when the first network device determines that the collective communication type of the first packet is broadcast and the first packet does not carry broadcast data, the payload of the first packet is different from a payload of the third packet, and a check value of the first packet is different from a check value of the third packet; or when the first network device determines that the collective communication type of the first packet is broadcast and the first packet carries broadcast data, the payload of the first packet is the same as a payload of the third packet, and a check value of the first packet is the same as a check value of the third packet.

In a possible implementation, when the first network device is in a remote direct memory access over converged Ethernet (RoCE) network, the first destination address is a destination media access control (MAC) address; when the first network device is in an internet protocol routable remote direct memory access over converged Ethernet (RoCEv2) network, the first destination address is a destination internet protocol (IP) address; or when the first network device is in an infiniband (IB) network, the first destination address is a destination local identifier (LID) address.

In a possible implementation, when the first network device is in the RoCE network, a first field of the first packet is the same as a first field of the third packet, and the first field includes at least one of a source MAC address, a source global identifier (GID) in a global route header (GRH), a destination GID in a GRH, or a destination queue pair (QP) number in a base transport header (BTH); when the first network device is in the RoCEv2 network, a second field of the first packet is the same as a second field of the third packet, and the second field includes at least one of a source IP address, a user datagram protocol (UDP) source port number, or a destination QP number in an IB transport header; or when the first network device is in the D3 network, a third field of the first packet is the same as a third field of the third packet, and the third field includes at least one of a source LID address or a destination QP number in a BTH.

According to a second aspect, an embodiment of this application provides a network device. The network device includes a switching chip. The switching chip is configured to: receive a first packet, where the first packet includes a first collective communication identifier and a first destination address, and the first destination address is an address of a first terminal device; receive at least one second packet, where each of the at least one second packet includes the first collective communication identifier; and send a third packet based on the first packet and the at least one second packet, where the third packet includes the first collective communication identifier and the first destination address.

In the second aspect, when no connection is established between the network device and the terminal device, the network device may aggregate and distribute collective communication packets by using a connection between the first terminal device and another terminal device. Therefore, the network device does not need to include a hardware module for establishing a connection to the terminal device, and this reduces hardware investment of the network device. In addition, the network device does not need to use a state machine to maintain a state of connection established between the network device and the terminal device. This reduces resource overheads of the network device.

In a possible implementation, the network device further includes a computing chip connected to the switching chip; the computing chip is configured to generate the third packet based on a payload of the second packet and a packet header of the first packet, where the second packet is a packet sent by a second network device; and the switching chip is configured to send the third packet.

In a possible implementation, the computing chip is configured to: determine that there is one terminal device in a local communication group corresponding to the first collective communication identifier; and extract a payload of the first packet to obtain first data; and the switching chip is configured to send the first data and the first collective communication identifier to the second network device.

In a possible implementation, the computing chip is configured to determine that there are at least two terminal devices in a local communication group corresponding to the first collective communication identifier; the switching chip is configured to receive at least one fourth packet, where each of the at least one fourth packet includes the first collective communication identifier, and the first packet and the at least one fourth packet are packets sent by all terminal devices in the local communication group corresponding to the first collective communication identifier; the computing chip is configured to aggregate a payload of the first packet and a payload of the at least one fourth packet to obtain second data; and the switching chip is configured to send the second data and the first collective communication identifier to the second network device.

In a possible implementation, the switching chip is configured to determine that a collective communication type of the first packet is global reduction or broadcast; and the computing chip is configured to determine that a quantity of terminal devices in the local communication group corresponding to the first collective communication identifier is less than a quantity of terminal devices in a global communication group corresponding to the first collective communication identifier.

In a possible implementation, the network device further includes a computing chip connected to the switching chip; the computing chip is configured to: determine that the first packet and the at least one second packet are packets sent by all terminal devices in a local communication group corresponding to the first collective communication identifier; aggregate a payload of the first packet and a payload of the at least one second packet to obtain third data; and generate the third packet based on the third data and a packet header of the first packet; and the switching chip is configured to send the third packet.

In a possible implementation, the switching chip is configured to determine that a collective communication type of the first packet is global reduction or broadcast; and the computing chip is configured to determine that a quantity of terminal devices in the local communication group corresponding to the first collective communication identifier is equal to a quantity of terminal devices in a global communication group corresponding to the first collective communication identifier.

In a possible implementation, the network device further includes a computing chip connected to the switching chip; the computing chip is configured to determine that the first collective communication identifier in the second packet is the same as the first collective communication identifier in the first packet, where the second packet is a packet sent by a second network device; and the switching chip is configured to send the third packet, where a payload of the third packet is the same as a payload of the first packet.

In a possible implementation, the computing chip is configured to: determine that there is one terminal device in a local communication group corresponding to the first collective communication identifier; and the switching chip is configured to send the first collective communication identifier to the second network device.

In a possible implementation, the computing chip is configured to determine that there are at least two terminal devices in a local communication group corresponding to the first collective communication identifier; and the switching chip is configured to receive at least one fifth packet, where each of the at least one fifth packet includes the first collective communication identifier, and the first packet and the at least one fifth packet are packets sent by all terminal devices in the local communication group corresponding to the first collective communication identifier; and send the first collective communication identifier to the second network device.

In a possible implementation, the switching chip is configured to determine that a collective communication type of the first packet is synchronization; and the computing chip is configured to determine that a quantity of terminal devices in the local communication group corresponding to the first collective communication identifier is less than a quantity of terminal devices in a global communication group corresponding to the first collective communication identifier.

In a possible implementation, the network device further includes a computing chip connected to the switching chip; the computing chip is configured to determine that the first packet and the at least one second packet are packets sent by all terminal devices in a local communication group corresponding to the first collective communication identifier; and the switching chip is configured to send the third packet, where a payload of the third packet is the same as a payload of the first packet.

In a possible implementation, the switching chip is configured to determine that a collective communication type of the first packet is synchronization; and the computing chip is configured to determine that a quantity of terminal devices in the local communication group corresponding to the first collective communication identifier is equal to a quantity of terminal devices in a global communication group corresponding to the first collective communication identifier.

According to a third aspect, an embodiment of this application provides a network device. The network device includes a receiving module and a sending module. The receiving module is configured to: receive a first packet, where the first packet includes a first collective communication identifier and a first destination address, and the first destination address is an address of a first terminal device; and receive at least one second packet, where each of the at least one second packet includes the first collective communication identifier. The sending module is configured to send a third packet based on the first packet and the at least one second packet. The third packet includes the first collective communication identifier and the first destination address.

In a possible implementation, the network device further includes a processing module; the processing module is configured to generate the third packet based on a payload of the second packet and a packet header of the first packet, where the second packet is a packet sent by a second network device; and the sending module is configured to send the third packet.

In a possible implementation, the processing module is configured to: determine that there is one terminal device in a local communication group corresponding to the first collective communication identifier; and extract a payload of the first packet to obtain first data; and the sending module is configured to send the first data and the first collective communication identifier to the second network device.

In a possible implementation, the processing module is configured to: determine that there are at least two terminal devices in a local communication group corresponding to the first collective communication identifier; the receiving module is configured to receive at least one fourth packet, where each of the at least one fourth packet includes the first collective communication identifier, and the first packet and the at least one fourth packet are packets sent by all terminal devices in the local communication group corresponding to the first collective communication identifier; the processing module is configured to aggregate a payload of the first packet and a payload of the at least one fourth packet to obtain second data; and the sending module is configured to send the second data and the first collective communication identifier to the second network device.

In a possible implementation, the processing module is configured to: determine that a collective communication type of the first packet is global reduction or broadcast; and determine that a quantity of terminal devices in the local communication group corresponding to the first collective communication identifier is less than a quantity of terminal devices in a global communication group corresponding to the first collective communication identifier.

In a possible implementation, the network device further includes a processing module; the processing module is configured to: determine that the first packet and the at least one second packet are packets sent by all terminal devices in a local communication group corresponding to the first collective communication identifier; aggregate a payload of the first packet and a payload of the at least one second packet to obtain third data; and generate the third packet based on the third data and a packet header of the first packet; and the sending module is configured to send the third packet.

In a possible implementation, the processing module is configured to: determine that a collective communication type of the first packet is global reduction or broadcast; and determine that a quantity of terminal devices in the local communication group corresponding to the first collective communication identifier is equal to a quantity of terminal devices in a global communication group corresponding to the first collective communication identifier.

In a possible implementation, the network device further includes a processing module; the processing module is configured to determine that the first collective communication identifier in the second packet is the same as the first collective communication identifier in the first packet, where the second packet is a packet sent by a second network device; and the sending module is configured to send the third packet, where a payload of the third packet is the same as a payload of the first packet.

In a possible implementation, the processing module is configured to determine that there is one terminal device in a local communication group corresponding to the first collective communication identifier; and the sending module is configured to send the first collective communication identifier to the second network device.

In a possible implementation, the processing module is configured to determine that there are at least two terminal devices in a local communication group corresponding to the first collective communication identifier; the receiving module is configured to receive at least one fifth packet, where each of the at least one fifth packet includes the first collective communication identifier, and the first packet and the at least one fifth packet are packets sent by all terminal devices in the local communication group corresponding to the first collective communication identifier; and the sending module is configured to send the first collective communication identifier to the second network device.

In a possible implementation, the processing module is configured to: determine that a collective communication type of the first packet is synchronization; and determine that a quantity of terminal devices in the local communication group corresponding to the first collective communication identifier is less than a quantity of terminal devices in a global communication group corresponding to the first collective communication identifier.

In a possible implementation, the network device further includes a processing module; the processing module is configured to determine that the first packet and the at least one second packet are packets sent by all terminal devices in a local communication group corresponding to the first collective communication identifier; and the sending module is configured to send the third packet, where a payload of the third packet is the same as a payload of the first packet.

In a possible implementation, the processing module is configured to: determine that a collective communication type of the first packet is synchronization; and determine that a quantity of terminal devices in the local communication group corresponding to the first collective communication identifier is equal to a quantity of terminal devices in a global communication group corresponding to the first collective communication identifier.

According to a fourth aspect, an embodiment of this application provides a system. The system includes a first network device and at least two terminal devices. The first network device receives a first packet. The first packet includes a first collective communication identifier and a first destination address, and the first destination address is an address of a first terminal device. The first network device receives at least one second packet. Each of the at least one second packet includes the first collective communication identifier. The first network device sends a third packet based on the first packet and the at least one second packet. The third packet includes the first collective communication identifier and the first destination address.

In the fourth aspect, in this embodiment of this application, when no connection is established between the first network device and each of the at least two terminal devices, the first network device may aggregate and distribute collective communication packets by using a connection between the at least two terminal devices. Therefore, the first network device does not need to include a hardware module for establishing a connection to each of the at least two terminal devices, thereby reducing hardware investment of the first network device. In addition, the first network device does not need to use a state machine to maintain a state of connection established between the first network device and each of the at least two terminal devices, thereby reducing resource overheads of the first network device.

In a possible implementation, that the first network device sends a third packet based on the first packet and the at least one second packet includes: The first network device generates the third packet based on a payload of the second packet and a packet header of the first packet, where the second packet is a packet sent by a second network device; and the first network device sends the third packet.

The first network device may generate the third packet based on the payload of the second packet and the packet header of the first packet. Therefore, the first network device does not need to construct the third packet.

In a possible implementation, after the first network device receives the first packet and before the first network device receives the at least one second packet, the first network device determines that there is one terminal device in a local communication group corresponding to the first collective communication identifier; the first network device extracts a payload of the first packet to obtain first data; and the first network device sends the first data and the first collective communication identifier to the second network device.

When there is one terminal device in the local communication group corresponding to the first collective communication identifier, the first network device may extract only the payload of the first packet to obtain the first data, and then send the first data and the first collective communication identifier to the second network device.

In a possible implementation, after the first network device receives the first packet and before the first network device receives the at least one second packet, the method further includes: The first network device determines that there are at least two terminal devices in a local communication group corresponding to the first collective communication identifier; the first network device receives at least one fourth packet, where each of the at least one fourth packet includes the first collective communication identifier, and the first packet and the at least one fourth packet are packets sent by all terminal devices in the local communication group corresponding to the first collective communication identifier; the first network device aggregates a payload of the first packet and a payload of the at least one fourth packet to obtain second data; and the first network device sends the second data and the first collective communication identifier to the second network device.

When there are at least two terminal devices in the local communication group corresponding to the first collective communication identifier, the first network device may aggregate the payload of the first packet and the payload of the at least one fourth packet to obtain the second data, and then send the second data and the first collective communication identifier to the second network device.

In a possible implementation, the first network device determines that a collective communication type of the first packet is global reduction or broadcast; and the first network device determines that a quantity of terminal devices in the local communication group corresponding to the first collective communication identifier is less than a quantity of terminal devices in a global communication group corresponding to the first collective communication identifier.

In a possible implementation, that the first network device sends a third packet based on the first packet and the at least one second packet includes: The first network device determines that the first packet and the at least one second packet are packets sent by all terminal devices in a local communication group corresponding to the first collective communication identifier; the first network device aggregates a payload of the first packet and a payload of the at least one second packet to obtain third data; the first network device generates the third packet based on the third data and a packet header of the first packet; and the first network device sends the third packet.

The first network device may generate the third packet based on the third data and the packet header of the first packet. Therefore, the first network device does not need to construct the third packet.

In a possible implementation, the first network device determines that a collective communication type of the first packet is global reduction or broadcast; and the first network device determines that a quantity of terminal devices in the local communication group corresponding to the first collective communication identifier is equal to a quantity of terminal devices in a global communication group corresponding to the first collective communication identifier.

In a possible implementation, that the first network device sends a third packet based on the first packet and the at least one second packet includes: The first network device determines that the first collective communication identifier in the second packet is the same as the first collective communication identifier in the first packet, where the second packet is a packet sent by a second network device; and the first network device sends the third packet, where a payload of the third packet is the same as a payload of the first packet.

The first network device may generate the third packet, and the payload of the third packet is the same as the payload of the first packet. Therefore, the first network device does not need to construct the third packet.

In a possible implementation, after the first network device receives the first packet and before the first network device receives the at least one second packet, the method further includes: The first network device determines that there is one terminal device in a local communication group corresponding to the first collective communication identifier; and the first network device sends the first collective communication identifier to the second network device.

When there is one terminal device in the local communication group corresponding to the first collective communication identifier, the first network device may send only the first collective communication identifier to the second network device.

In a possible implementation, after the first network device receives the first packet and before the first network device receives the at least one second packet, the method further includes: The first network device determines that there are at least two terminal devices in a local communication group corresponding to the first collective communication identifier; the first network device receives at least one fifth packet, where each of the at least one fifth packet includes the first collective communication identifier, and the first packet and the at least one fifth packet are packets sent by all terminal devices in the local communication group corresponding to the first collective communication identifier; and the first network device sends the first collective communication identifier to the second network device.

When there are at least two terminal devices in the local communication group corresponding to the first collective communication identifier, the first network device may send the first collective communication identifier to the second network device.

In a possible implementation, the method further includes: The first network device determines that a collective communication type of the first packet is synchronization; and the first network device determines that a quantity of terminal devices in the local communication group corresponding to the first collective communication identifier is less than a quantity of terminal devices in a global communication group corresponding to the first collective communication identifier.

In a possible implementation, that the first network device sends a third packet based on the first packet and the at least one second packet includes: The first network device determines that the first packet and the at least one second packet are packets sent by all terminal devices in a local communication group corresponding to the first collective communication identifier; and the first network device sends the third packet, where a payload of the third packet is the same as a payload of the first packet.

The first network device may generate the third packet, and the payload of the third packet is the same as the payload of the first packet. Therefore, the first network device does not need to construct the third packet.

In a possible implementation, the method further includes: The first network device determines that a collective communication type of the first packet is synchronization; and the first network device determines that a quantity of terminal devices in the local communication group corresponding to the first collective communication identifier is equal to a quantity of terminal devices in a global communication group corresponding to the first collective communication identifier.

In a possible implementation, when the first network device determines that the collective communication type of the first packet is global reduction, the payload of the first packet is different from a payload of the third packet, and a check value of the first packet is different from a check value of the third packet; when the first network device determines that the collective communication type of the first packet is broadcast and the first packet does not carry broadcast data, the payload of the first packet is different from a payload of the third packet, and a check value of the first packet is different from a check value of the third packet; or when the first network device determines that the collective communication type of the first packet is broadcast and the first packet carries broadcast data, the payload of the first packet is the same as a payload of the third packet, and a check value of the first packet is the same as a check value of the third packet.

In a possible implementation, when the first network device is in a remote direct memory access over converged Ethernet (RoCE) network, the first destination address is a destination media access control (MAC) address; when the first network device is in an internet protocol routable remote direct memory access over converged Ethernet (RoCEv2) network, the first destination address is a destination internet protocol (IP) address; or when the first network device is in an infiniband (IB) network, the first destination address is a destination local identifier (LID) address.

In a possible implementation, when the first network device is in the RoCE network, a first field of the first packet is the same as a first field of the third packet, and the first field includes at least one of a source MAC address, a source global identifier (GID) in a global route header (GRH), a destination GID in a GRH, or a destination queue pair (QP) number in a base transport header (BTH); when the first network device is in the RoCEv2 network, a second field of the first packet is the same as a second field of the third packet, and the second field includes at least one of a source IP address, a user datagram protocol (UDP) source port number, or a destination QP number in an IB transport header; or when the first network device is in the D3 network, a third field of the first packet is the same as a third field of the third packet, and the third field includes at least one of a source LID address or a destination QP number in a BTH.

DESCRIPTION OF EMBODIMENTS

The embodiments of this application provide a collective communication method, apparatus, and system, to resolve a problem mentioned in the background. When no connection is established between a network device and a terminal device, the network device may aggregate and distribute collective communication packets by using a connection between terminal devices. The network device in the embodiments of this application may be a device such as a switch or a router, and the terminal device in the embodiments of this application may be a device such as a server. Certainly, the network device and the terminal device in the embodiments of this application are not limited to the foregoing devices, and may alternatively be other devices.

Figure 1:
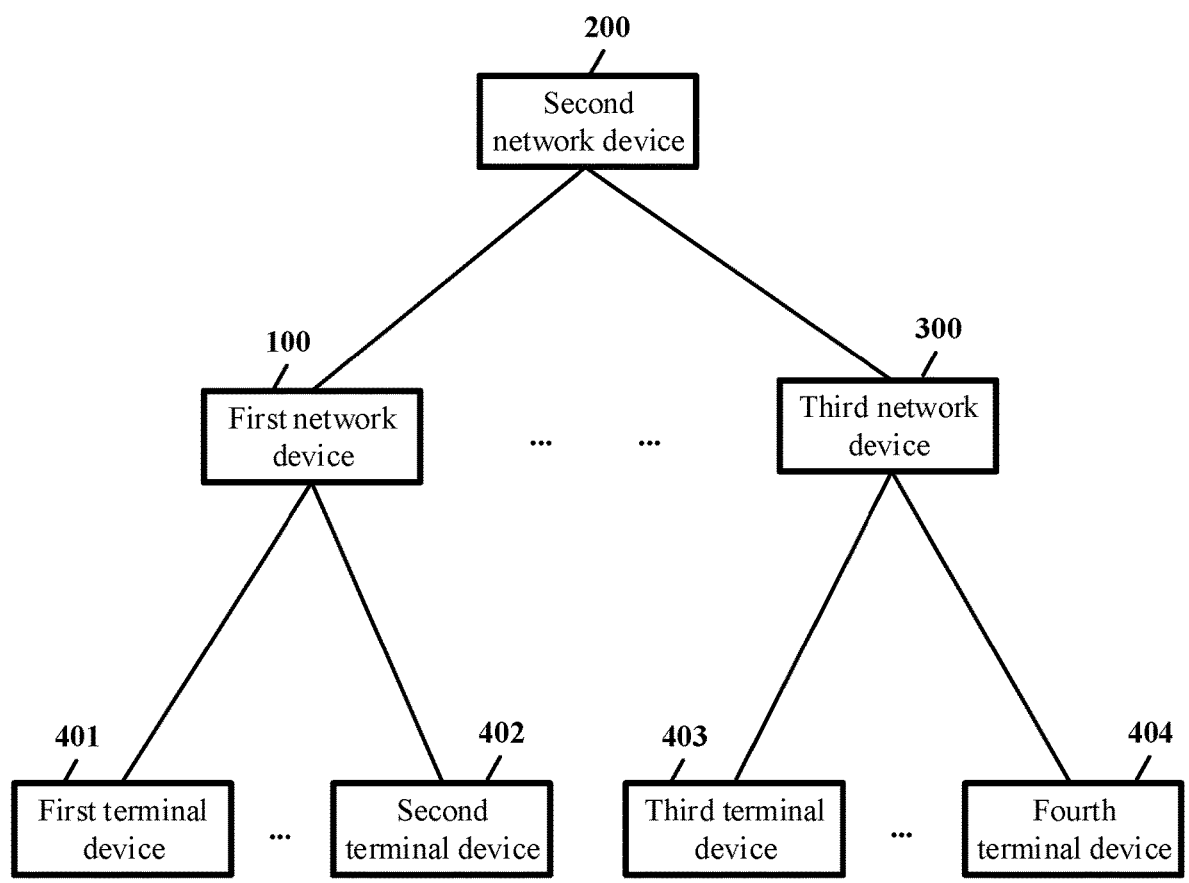
FIG. 1 is a schematic diagram of a network according to an embodiment of this application.

FIG. 1 is a schematic diagram of a network according to an embodiment of this application. In the embodiment shown in FIG. 1, child nodes of a second network device 200 include network devices such as a first network device 100 and a third network device 300, child nodes of the first network device 100 include terminal devices such as a first terminal device 401 and a second terminal device 402, and child nodes of the third network device 300 include terminal devices such as a third terminal device 403 and a fourth terminal device 404. Certainly, quantities of network devices and terminal devices in FIG. 1 may vary with an actual situation. For example, the first network device 100 may have one or more child nodes. For another example, the first network device 100 may have one or more parent nodes.

With reference to FIG. 1 and Table 1, Table 1 shows an information table pre-generated by the first network device 100.

TABLE 1

| Collective communication identifier | Name of a local communication group | Port number of a child node | Port number of a parent node | Quantity of terminal devices in a global communication group |
|---|---|---|---|---|
| 1001 | A1 | P1 and P2 | P10 | 4 |
| ... | ... | ... | ... | ... |

In Table 1, the first column in Table 1 is the collective communication identifier, and the collective communication identifier is an identifier of each of a local communication group and a global communication group. For example, in the embodiment shown in FIG. 1 and Table 1, the collective communication identifier (1001) is an identifier of each of the local communication group (A1) and the global communication group (B1). The local communication group (A1) includes the first terminal device 401 and the second terminal device 402. The global communication group (B1) includes the first terminal device 401, the second terminal device 402, the third terminal device 403, and the fourth terminal device 404.

In Table 1, the second column in Table 1 is the name of the local communication group corresponding to the collective communication identifier. For example, in the embodiment shown in FIG. 1 and Table 1, a name of the local communication group is A1, and the local communication group (A1) includes the first terminal device 401 and the second terminal device 402.

In Table 1, the third column in Table 1 is the port number of the child node corresponding to the collective communication identifier, and a port corresponding to the port number of the child node is a port through which a network device communicates with the child node. For example, in the embodiment shown in FIG. 1 and Table 1, port numbers of child nodes include P1 and P2. A port corresponding to the port number P1 is a port through which the first network device 100 communicates with the first terminal device 401. A port corresponding to the port number P2 is a port through which the first network device 100 communicates with the second terminal device 402.

In Table 1, the fourth column in Table 1 is the port number of the parent node corresponding to the collective communication identifier, and a port corresponding to the port number of the parent node is a port through which the network device communicates with the parent node. For example, in the embodiment shown in FIG. 1 and Table 1, the port number of the parent node includes P10, and a port corresponding to the port number P10 is a port through which the first network device 100 communicates with the second network device 200.

In Table 1, the fifth column in Table 1 is the quantity of terminal devices in the global communication group corresponding to the collective communication identifier. For example, in the embodiment shown in FIG. 1 and Table 1, a name of the global communication group is B1, the global communication group (B1) includes the first terminal device 401, the second terminal device 402, the third terminal device 403, and the fourth terminal device 404, and there are four terminal devices in the global communication group (B1).

In the embodiment shown in FIG. 1 and Table 1, the local communication group (A1) includes the first terminal device 401 and the second terminal device 402. A connection is established between the first terminal device 401 and the second terminal device 402, and therefore the first network device 100 may aggregate and distribute collective communication packets by using the connection between the first terminal device 401 and the second terminal device 402, and no hardware module for establishing a connection to each of the first terminal device 401 and the second terminal device 402 needs to be disposed on the first network device 100. A situation of the third network device 300 is similar to that of the first network device 100. For the situation of the third network device 300, refer to the detailed description of the first network device 100.

Figure 2A:
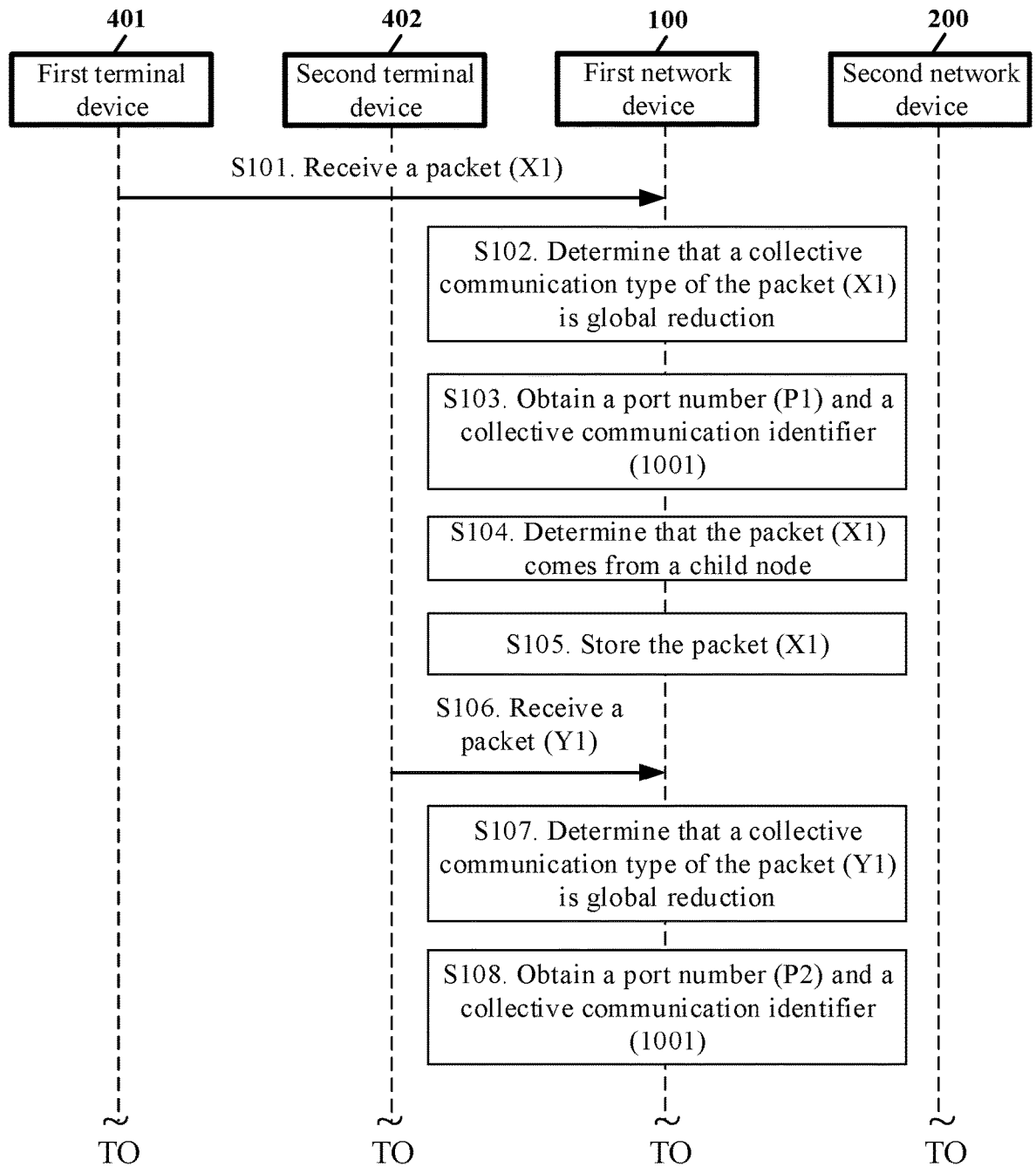
FIG. 2A and FIG. 2B are a flowchart of a method in which a collective communication type of a packet is global reduction according to an embodiment of this application.
Figure 2B:
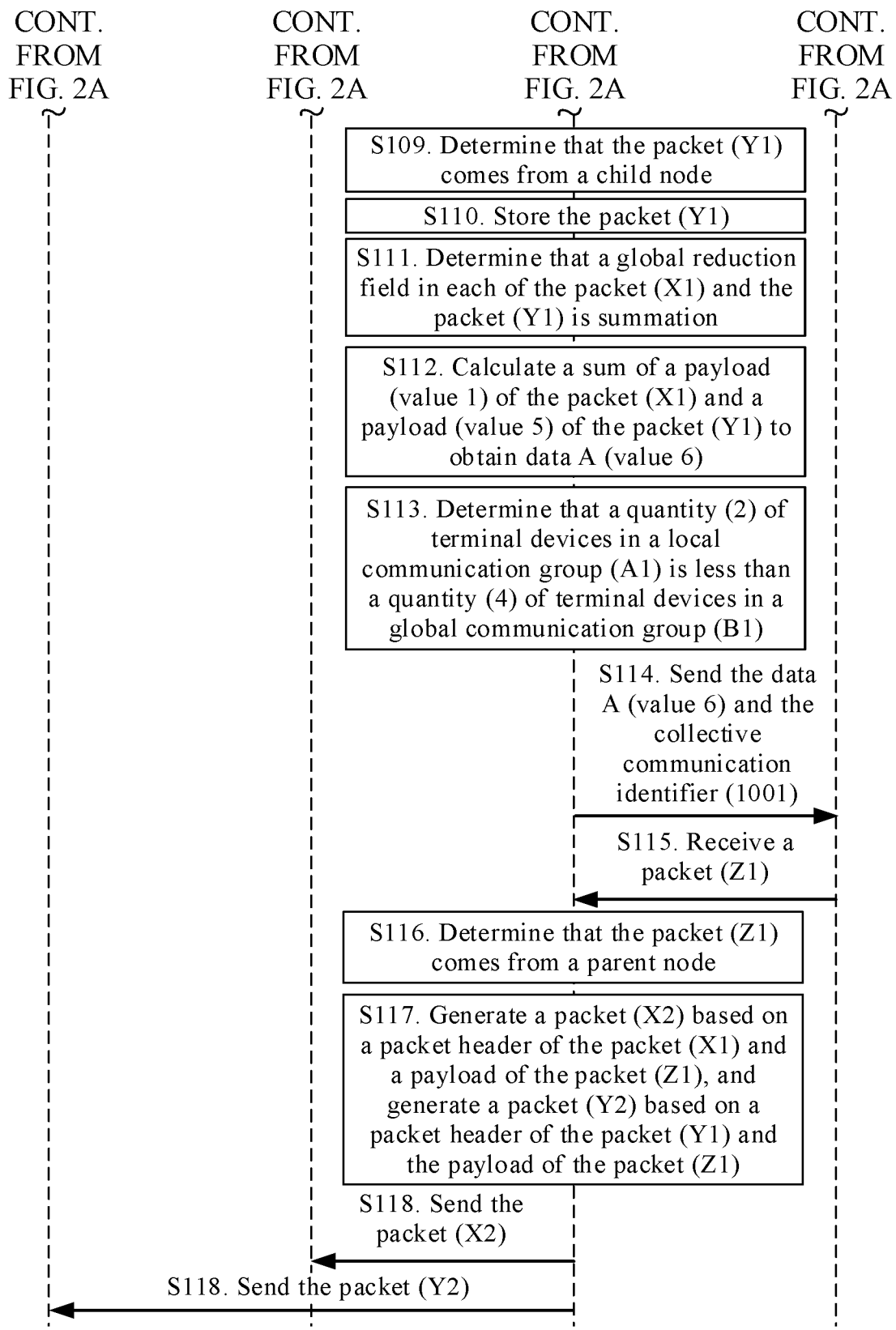

Refer to FIG. 1. FIG. 2A, FIG. 2B, and Table 1, FIG. 2A and FIG. 2B are a flowchart of a method in which a collective communication type of a packet is global reduction according to an embodiment of this application.

In the embodiments shown in FIG. 1, FIG. 2A, FIG. 2B, and Table 1, a local communication group (A1) corresponding to a collective communication identifier (1001) includes a first terminal device 401 and a second terminal device 402. A connection is established between the first terminal device 401 and the second terminal device 402 in advance, and the first terminal device 401 sends a packet (X1) to the second terminal device 402 by using a first network device 100. The collective communication method provided in this embodiment of this application includes the following steps.

Step S101: The first network device 100 receives the packet (X1) sent by the first terminal device 401.

The packet (X1) includes a packet header, a payload, and a check value. The payload includes a value 1. The check value is JYZ1. The packet header of the packet (X1) includes a collective communication identifier, a collective communication field, and a destination address. The collective communication identifier is 1001, the collective communication field is QJGY, and the destination address is 192.168.1.1. The destination address (192.168.1.1) is an address of the second terminal device 402.

Step S102: The first network device 100 determines, based on the collective communication field (QJGY) of the packet (X1) and Table 2, that a collective communication type of the packet (X1) is global reduction.

Table 2 shows a table that is of a mapping relationship between a collective communication field and a collective communication type and that is prestored in the first network device 100. After the first network device 100 receives the packet (X1), the first network device 100 extracts the collective communication field (QJGY) in the packet header of the packet (X1). The first network device 100 determines, based on the collective communication field (QJGY) and Table 2, that the collective communication type of the packet (X1) is global reduction.

TABLE 2

| Collective communication field | Collective communication type |
|---|---|
| QJGY | Global reduction |
| GB | PA |
| TB | Synchronization |

Step S103: The first network device 100 obtains a port number (P1) corresponding to a port for receiving the packet (X1), and obtains the collective communication identifier (1001) in the packet header of the packet (X1).

The first network device 100 predetermines that a port number corresponding to a port for communicating with the first terminal device 401 is P1, and a port number corresponding to a port for communicating with the second terminal device 402 is P2. After the first network device 100 receives, by using the port (P1), the packet (X1) sent by the first terminal device 401, the first network device 100 may obtain the port number (P1) corresponding to the port for receiving the packet (X1).

Step S104: The first network device 100 may determine, based on the collective communication identifier (1001), the port (P1), and Table 1, that the packet (X1) comes from a child node.

In Table 1, the collective communication identifier (1001) and the port (P1) correspond to a port number of a child node. Therefore, the first network device 100 may determine that the packet (X1) comes from a child node.

Step S105: The first network device 100 stores the packet (X1).

The collective communication type of the packet (X1) is global reduction, and therefore the first network device 100 needs to buffer the packet (X1), so that the first network device 100 may use the packet header of the packet (X1) in a subsequent step.

Step S106: The first network device 100 receives a packet (Y1) sent by the second terminal device 402.

The packet (Y1) includes a packet header, a payload, and a check value. The payload includes a value 5. The check value is JYZ2. The packet header of the packet (Y1) includes a collective communication identifier, a collective communication field, and a destination address. The collective communication identifier is 1001, the collective communication field is QJGY, and the destination address is 192.168.1.5. The destination address (192.168.1.5) is an address of the first terminal device 401.

Step S107: The first network device 100 determines, based on the collective communication field (QJGY) of the packet (Y1) and Table 2, that a collective communication type of the packet (Y1) is global reduction.

Step S108: The first network device 100 obtains the port number (P2) corresponding to the port for receiving the packet (Y1), and obtains the collective communication identifier (1001) in the packet header of the packet (Y1).

Step S109: The first network device 100 may determine, based on the collective communication identifier (1001), the port (P2), and Table 1, that the packet (Y1) comes from a child node.

Step S110: The first network device 100 stores the packet (Y1).

Step S111: After the first network device 100 determines that the port corresponding to each of the port numbers (P1 and P2) of the child nodes receives the collective communication packet, the first network device 100 determines that a global reduction field in each of the packet (X1) and the packet (Y1) is summation.

There are a plurality of types of global reduction fields in a packet header of a packet. For example, the global reduction field may be summation, a maximum value, or a minimum value.

Step S112: The first network device 100 extracts the payload (value 1) of the packet (X1) and the payload (value 5) of the packet (Y1), and the first network device 100 calculates a sum of the payload (value 1) of the packet (X1) and the payload (value 5) of the packet (Y1) to obtain data A (value 6).

The payload of the packet (X1) is the value 1, the payload of the packet (Y1) is the value 5, and the data A=the payload (value 1) of the packet (X1)+the payload (value 5) of the packet (Y1)=1+5=6.

Step S113: The first network device 100 determines, based on Table 1, a quantity (2) of terminal devices in the local communication group (A1) corresponding to the collective communication identifier (1001), and determines, based on Table 1, a quantity (4) of terminal devices in a global communication group (B1) corresponding to the collective communication identifier (1001), and the first network device 100 determines that the quantity (2) of terminal devices in the local communication group (A1) is less than the quantity (4) of terminal devices in the global communication group (B1).

When the quantity (2) of terminal devices in the local communication group (A1) is less than the quantity (4) of terminal devices in the global communication group (B1), it indicates that the first network device 100 further needs to send the data A to a second network device 200.

Step S114: The first network device 100 sends the data A (value 6) and the collective communication identifier (1001) to the second network device 200.

After the second network device 200 receives the data A (value 6) and the collective communication identifier (1001) sent by the first network device 100, the second network device 200 further receives data B (value 4) and the collective communication identifier (1001) sent by a third network device 300. After the second network device 200 receives the data A (value 6) and the data B (value 4), the second network device 200 sums up the data A (value 6) and the data B (value 4) to obtain data C (value 10). The data C=the data A+the data B=6+4=10. The second network device 200 sends a packet (Z1) that includes the data C (value 10) and the collective communication identifier (1001) to the first network device 100, and the second network device 200 sends a packet (Z2) that includes the data C (value 10) and the collective communication identifier (1001) to the third network device 300.

Step S115: The first network device 100 receives the packet (Z1) sent by the second network device 200.

Step S116: The first network device 100 may determine, based on the collective communication identifier (1001) in the packet (Z1), a port (P10) for receiving the packet (Z1), and Table 1, that the packet (Z1) comes from a parent node.

The packet (Z1) includes a packet header, a payload, and a check value. The payload includes a value 10. The check value is JYZ3. The packet header of the packet (Z1) includes a collective communication identifier, and the collective communication identifier is 1001.

Step S117: The first network device 100 generates a packet (X2) based on the packet header of the packet (X1) and the payload of the packet (Z1), and the first network device 100 generates a packet (Y2) based on the packet header of the packet (Y1) and the payload of the packet (Z1).

A packet header of the packet (X2) is the packet header of the packet (X1), a payload of the packet (X2) is the payload of the packet (Z1), and a check value of the packet (X2) is calculated based on the packet header of the packet (X1) and the payload of the packet (Z1). Specifically, the packet (X2) includes the packet header, the payload, and the check value. The payload includes the value 10. The check value is JYZ4. The packet header of the packet (X2) includes a collective communication identifier, a collective communication field, and a destination address. The collective communication identifier is 1001, the collective communication field is QJGY, and the destination address is 192.168.1.1. The destination address (192.168.1.1) is the address of the second terminal device 402.

A packet header of the packet (Y2) is the packet header of the packet (Y1), a payload of the packet (Y2) is the payload of the packet (Z1), and a check value of the packet (Y2) is calculated based on the packet header of the packet (Y1) and the payload of the packet (Z1). Specifically, the packet (Y2) includes the packet header, the payload, and the check value. The payload includes the value 10. The check value is JYZ5. The packet header of the packet (Y2) includes a collective communication identifier, a collective communication field, and a destination address. The collective communication identifier is 1001, the collective communication field is QJGY, and the destination address is 192.168.1.5. The destination address (192.168.1.5) is the address of the first terminal device 401.

The payload of the packet (X2) is the value 10, and the payload of the packet (X1) is the value 1. Therefore, the payload of the packet (X2) is different from the payload of the packet (X1). The payload of the packet (X2) is different from the payload of the packet (X1), and the check value is calculated based on the packet header of the packet and the payload of the packet. Therefore, the check value of the packet (X2) is different from the check value of the packet (X1). The payload of the packet (Y2) is the value 10, and the payload of the packet (Y1) is the value 5. Therefore, the payload of the packet (Y2) is different from the payload of the packet (Y1). The payload of the packet (Y2) is different from the payload of the packet (Y1), and the check value is calculated based on the packet header of the packet and the payload of the packet. Therefore, the check value of the packet (Y2) is different from the check value of the packet (Y1).

Step S118: The first network device 100 sends the packet (X2) and the packet (Y2).

The destination address (192.168.1.1) in the packet header of the packet (X2) is the address of the second terminal device 402, and the second terminal device 402 receives the packet (X2) sent by the first network device 100. The destination address (192.168.1.5) in the packet header of the packet (Y2) is the address of the first terminal device 401, and the first terminal device 401 receives the packet (Y2) sent by the first network device 100.

In the embodiments shown in FIG. 1, FIG. 2A, FIG. 2B, and Table 1, after the first network device 100 obtains a final global reduction result (value 10), the first network device 100 generates the packet (X2) by using the packet header of the packet (X1) and the final global reduction result (value 10), generates the packet (Y2) by using the packet header of the packet (Y1) and the final global reduction result (value 10), and sends the packet (X2) and the packet (Y2), so that the first terminal device 401 and the second terminal device 402 respectively receive the packet (Y2) and the packet (X2). In this embodiment of this application, when no connection is established between the first network device 100 and each of the first terminal device 401 and the second terminal device 402, the first network device 100 may aggregate and distribute collective communication packets by using the connection between the first terminal device 401 and the second terminal device 402. Therefore, the first network device 100 does not need to include a hardware module for establishing a connection to the terminal device, and this reduces hardware investment of the first network device 100. In addition, the first network device 100 does not need to use a state machine to maintain a state of connection established between the first network device 100 and the terminal device. This reduces resource overheads of the first network device 100.

In addition, steps of the third network device 300 are similar to the steps of the first network device 100. For the steps of the third network device 300, refer to the steps of the first network device 100.

In addition, if the local communication group (A1) includes a plurality of terminal devices, for example, if the local communication group (A1) includes terminal devices A, B, C, and D, there are many manners of establishing a connection. For example, a connection is established between the terminal device A and the terminal device B, a connection is established between the terminal device B and the terminal device C, a connection is established between the terminal device C and the terminal device D, and a connection is established between the terminal device D and the terminal device A. Certainly, a communication connection may be alternatively established between the terminal devices in the local communication group (A1) in another manner.

Refer to FIG. 1. If the local communication group (A1) includes one terminal device, for example, if the local communication group (A1) includes the first terminal device 401, and the global communication group (B1) includes the first terminal device 401, a third terminal device 403, and a fourth terminal device 404, there are many manners of establishing a connection. For example, a connection is established between the first terminal device 401 and the third terminal device 403, a connection is established between the third terminal device 403 and the fourth terminal device 404, and a connection is established between the first terminal device 401 and the fourth terminal device 404. In this case, the first network device 100 receives only the packet (X1) sent by the first terminal device 401. If the collective communication type of the packet (X1) is global reduction, and the quantity (1) of terminal devices in the local communication group (A1) is less than the quantity (3) of terminal devices in the global communication group (B1), the first network device 100 sends the payload (value 1) of the packet (X1) and the collective communication identifier (1001) to the second network device 200.

Figure 3A:
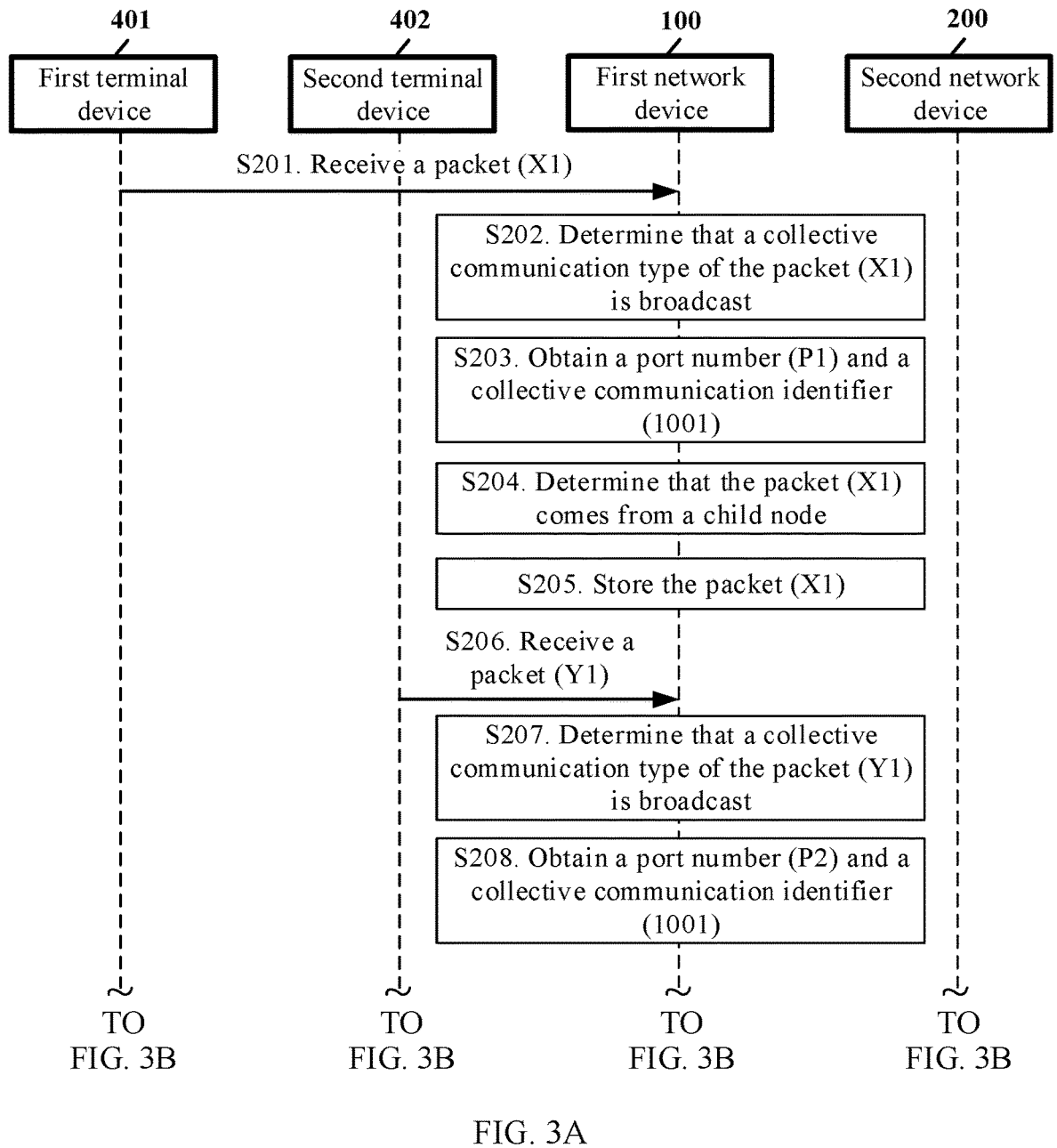
FIG. 3A and FIG. 3B are a flowchart of a method in which a collective communication type of a packet is broadcast according to an embodiment of this application.
Figure 3B:
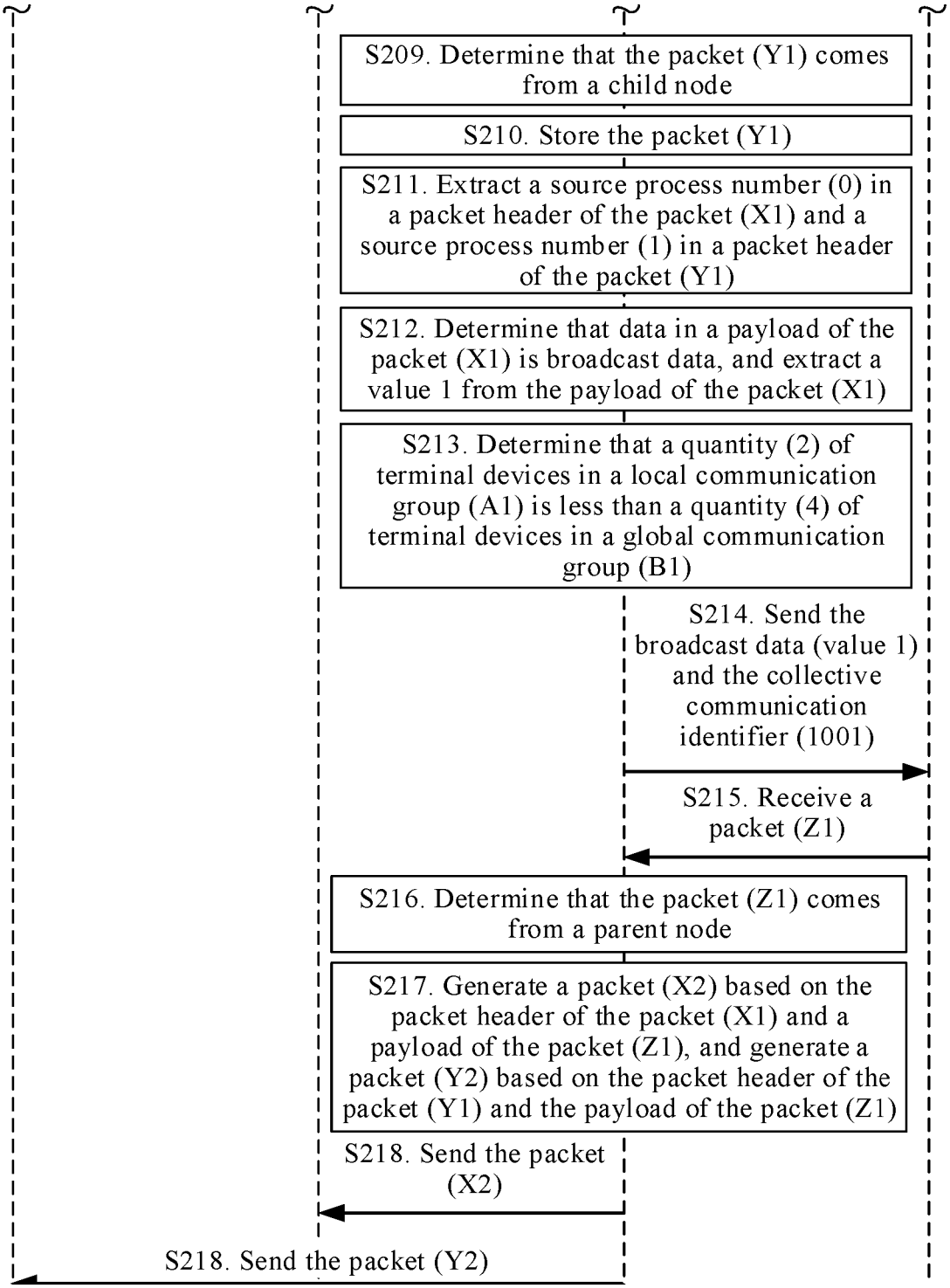

Refer to FIG. 1, FIG. 3A, FIG. 3B, and Table 1. FIG. 3A and FIG. 3B are a flowchart of a method in which a collective communication type of a packet is broadcast according to an embodiment of this application.

In the embodiments shown in FIG. 1, FIG. 3A, FIG. 3B, and Table 1, a local communication group (A1) corresponding to a collective communication identifier (1001) includes a first terminal device 401 and a second terminal device 402. A connection is established between the first terminal device 401 and the second terminal device 402 in advance, and the first terminal device 401 sends a packet (X1) to the second terminal device 402 by using a first network device 100. The collective communication method provided in this embodiment of this application includes the following steps.

Step S201: The first network device 100 receives the packet (X1) sent by the first terminal device 401.

The packet (X1) includes a packet header, a payload, and a check value. The payload includes a value 1. The check value is JYZ1. The packet header of the packet (X1) includes a collective communication identifier, a collective communication field, and a destination address. The collective communication identifier is 1001, the collective communication field is GB, and the destination address is 192.168.1.1. The destination address (192.168.1.1) is an address of the second terminal device 402.

Step S202: The first network device 100 determines, based on the collective communication field (GB) of the packet (X1) and Table 2, that a collective communication type of the packet (X1) is broadcast.

Table 2 shows a table that is of a mapping relationship between a collective communication field and a collective communication type and that is prestored in the first network device 100. After the first network device 100 receives the packet (X1), the first network device 100 extracts the collective communication field (GB) in the packet header of the packet (X1). The first network device 100 determines, based on the collective communication field (GB) and Table 2, that the collective communication type of the packet (X1) is broadcast.

Step S203: The first network device 100 obtains a port number (P1) corresponding to a port for receiving the packet (X1), and obtains the collective communication identifier (1001) in the packet header of the packet (X1).

The first network device 100 predetermines that a port number corresponding to a port for communicating with the first terminal device 401 is P1, and a port number corresponding to a port for communicating with the second terminal device 402 is P2. After the first network device 100 receives, by using the port (P1), the packet (X1) sent by the first terminal device 401, the first network device 100 may obtain the port number (P1) corresponding to the port for receiving the packet (X1).

Step S204: The first network device 100 may determine, based on the collective communication identifier (1001), the port (P1), and Table 1, that the packet (X1) comes from a child node.

In Table 1, the collective communication identifier (1001) and the port (P1) correspond to a port number of a child node. Therefore, the first network device 100 may determine that the packet (X1) comes from a child node.

Step S205: The first network device 100 stores the packet (X1).

The collective communication type of the packet (X1) is broadcast, and therefore the first network device 100 needs to buffer the packet (X1), so that the first network device 100 may use the packet header of the packet (X1) in a subsequent step.

Step S206: The first network device 100 receives a packet (Y1) sent by the second terminal device 402.

The packet (Y1) includes a packet header, a payload, and a check value. The payload includes a value 5. The check value is JYZ2. The packet header of the packet (Y1) includes a collective communication identifier, a collective communication field, and a destination address. The collective communication identifier is 1001, the collective communication field is GB, and the destination address is 192.168.1.5. The destination address (192.168.1.5) is an address of the first terminal device 401.

Step S207: The first network device 100 determines, based on the collective communication field (GB) of the packet (Y1) and Table 2, that a collective communication type of the packet (Y1) is broadcast.

Step S208: The first network device 100 obtains the port number (P2) corresponding to the port for receiving the packet (Y1), and obtains the collective communication identifier (1001) in the packet header of the packet (Y1).

Step S209: The first network device 100 may determine, based on the collective communication identifier (1001), the port (P2), and Table 1, that the packet (Y1) comes from a child node.

Step S210: The first network device 100 stores the packet (Y1).

Step S211: After the first network device 100 determines that the port corresponding to each of the port numbers (P1 and P2) of the child nodes receives the collective communication packet, the first network device 100 extracts a source process number (0) in the packet header of the packet (X1) and a source process number (1) in the packet header of the packet (Y1).

Step S212: The first network device 100 determines, based on Table 3, the source process number (0) in the packet header of the packet (X1), and the source process number (1) in the packet header of the packet (Y1), that data in the payload of the packet (X1) is broadcast data, and extracts the value 1 from the payload of the packet (X1), where the value 1 is the broadcast data.

Table 3 shows a table that is of a mapping relationship between a source process number and broadcast data and that is prestored in the first network device 100.

TABLE 3

| Source process number | Whether there is broadcast data in a packet |
|---|---|
| 0 | Yes |
| 1 | No |
| ... | ... |

Step S213: The first network device 100 determines, based on Table 1, a quantity (2) of terminal devices in the local communication group (A1) corresponding to the collective communication identifier (1001), and determines, based on Table 1, a quantity (4) of terminal devices in a global communication group (B1) corresponding to the collective communication identifier (1001), and the first network device 100 determines that the quantity (2) of terminal devices in the local communication group (A1) is less than the quantity (4) of terminal devices in the global communication group (B1).

When the quantity (2) of terminal devices in the local communication group (A1) is less than the quantity (4) of terminal devices in the global communication group (B1), it indicates that the first network device 100 further needs to send the broadcast data (value 1) to a second network device 200.

Step S214: The first network device 100 sends the broadcast data (value 1) and the collective communication identifier (1001) to the second network device 200.

After the second network device 200 receives the broadcast data (value 1) and the collective communication identifier (1001) sent by the first network device 100, the second network device 200 further receives the collective communication identifier (1001) sent by a third network device 300. The second network device 200 then sends a packet (Z1) that includes the broadcast data (value 1) and the collective communication identifier (1001) to the first network device 100, and the second network device 200 sends a packet (Z2) that includes the broadcast data (value 1) and the collective communication identifier (1001) to the third network device 300.

Step S215: The first network device 100 receives the packet (Z1) sent by the second network device 200.

Step S216: The first network device 100 may determine, based on the collective communication identifier (1001) in the packet (Z1), a port (P10) for receiving the packet (Z1), and Table 1, that the packet (Z1) comes from a parent node.

The packet (Z1) includes a packet header, a payload, and a check value. The payload includes a value 1. The check value is JYZ3. The packet header of the packet (Z1) includes a collective communication identifier, and the collective communication identifier is 1001.

Step S217: The first network device 100 generates a packet (X2) based on the packet header of the packet (X1) and the payload of the packet (Z1), and the first network device 100 generates a packet (Y2) based on the packet header of the packet (Y1) and the payload of the packet (Z1).

A packet header of the packet (X2) is the packet header of the packet (X1), a payload of the packet (X2) is the payload of the packet (Z1), and a check value of the packet (X2) is calculated based on the packet header of the packet (X1) and the payload of the packet (Z1). Specifically, the packet (X2) includes the packet header, the payload, and the check value. The payload includes the value 1. The check value is JYZ4. The packet header of the packet (X2) includes a collective communication identifier, a collective communication field, and a destination address. The collective communication identifier is 1001, the collective communication field is GB, and the destination address is 192.168.1.1. The destination address (192.168.1.1) is the address of the second terminal device 402.

A packet header of the packet (Y2) is the packet header of the packet (Y1), a payload of the packet (Y2) is the payload of the packet (Z1), and a check value of the packet (Y2) is calculated based on the packet header of the packet (Y1) and the payload of the packet (Z1). Specifically, the packet (Y2) includes the packet header, the payload, and the check value. The payload includes the value 1. The check value is JYZ5. The packet header of the packet (Y2) includes a collective communication identifier, a collective communication field, and a destination address. The collective communication identifier is 1001, the collective communication field is GB, and the destination address is 192.168.1.5. The destination address (192.168.1.5) is the address of the first terminal device 401.

The payload of the packet (X2) is the value 1, and the payload of the packet (X1) is the value 1. Therefore, the payload of the packet (X2) is the same as the payload of the packet (X1). The payload of the packet (X2) is the same as the payload of the packet (X1), the packet header of the packet (X2) is the same as the packet header of the packet (X1), and the check value is calculated based on the packet header of the packet and the payload of the packet. Therefore, the check value of the packet (X2) is the same as the check value of the packet (X1). The payload of the packet (Y2) is the value 1, and the payload of the packet (Y1) is the value 5. Therefore, the payload of the packet (Y2) is different from the payload of the packet (Y1). The payload of the packet (Y2) is different from the payload of the packet (Y1), and the check value is calculated based on the packet header of the packet and the payload of the packet. Therefore, the check value of the packet (Y2) is different from the check value of the packet (Y1).

Step S218: The first network device 100 sends the packet (X2) and the packet (Y2).

The destination address (192.168.1.1) in the packet header of the packet (X2) is the address of the second terminal device 402, and the second terminal device 402 receives the packet (X2) sent by the first network device 100. The destination address (192.168.1.5) in the packet header of the packet (Y2) is the address of the first terminal device 401, and the first terminal device 401 receives the packet (Y2) sent by the first network device 100.

In the embodiments shown in FIG. 1, FIG. 3A, FIG. 3B, and Table 1, after the first network device 100 obtains the broadcast data (value 1), the first network device 100 generates the packet (X2) by using the packet header of the packet (X1) and the broadcast data (value 1), generates the packet (Y2) by using the packet header of the packet (Y1) and the broadcast data (value 1), and sends the packet (X2) and the packet (Y2), so that the first terminal device 401 and the second terminal device 402 respectively receive the packet (Y2) and the packet (X2). In this embodiment of this application, when no connection is established between the first network device 100 and each of the first terminal device 401 and the second terminal device 402, the first network device 100 may aggregate and distribute collective communication packets by using the connection between the first terminal device 401 and the second terminal device 402. Therefore, the first network device 100 does not need to include a hardware module for establishing a connection to the terminal device, and this reduces hardware investment of the first network device 100. In addition, the first network device 100 does not need to use a state machine to maintain a state of connection established between the first network device 100 and the terminal device. This reduces resource overheads of the first network device 100.

In addition, steps of the third network device 300 are similar to the steps of the first network device 100. For the steps of the third network device 300, refer to the steps of the first network device 100.

In addition, if the local communication group (A1) includes a plurality of terminal devices, for example, if the local communication group (A1) includes terminal devices A, B, C, and D, there are many manners of establishing a connection. For example, a connection is established between the terminal device A and the terminal device B, a connection is established between the terminal device B and the terminal device C, a connection is established between the terminal device C and the terminal device D, and a connection is established between the terminal device D and the terminal device A. Certainly, a communication connection may be alternatively established between the terminal devices in the local communication group (A1) in another manner.

Refer to FIG. 1. If the local communication group (A1) includes one terminal device, for example, if the local communication group (A1) includes the first terminal device 401, and the global communication group (B1) includes the first terminal device 401, a third terminal device 403, and a fourth terminal device 404, there are many manners of establishing a connection. For example, a connection is established between the first terminal device 401 and the third terminal device 403, a connection is established between the third terminal device 403 and the fourth terminal device 404, and a connection is established between the first terminal device 401 and the fourth terminal device 404. In this case, the first network device 100 receives only the packet (X1) sent by the first terminal device 401. If the collective communication type of the packet (X1) is broadcast, and the quantity (1) of terminal devices in the local communication group (A1) is less than the quantity (3) of terminal devices in the global communication group (B1), the first network device 100 sends the broadcast data (value 1) and the collective communication identifier (1001) to the second network device 200.

Figure 4A:
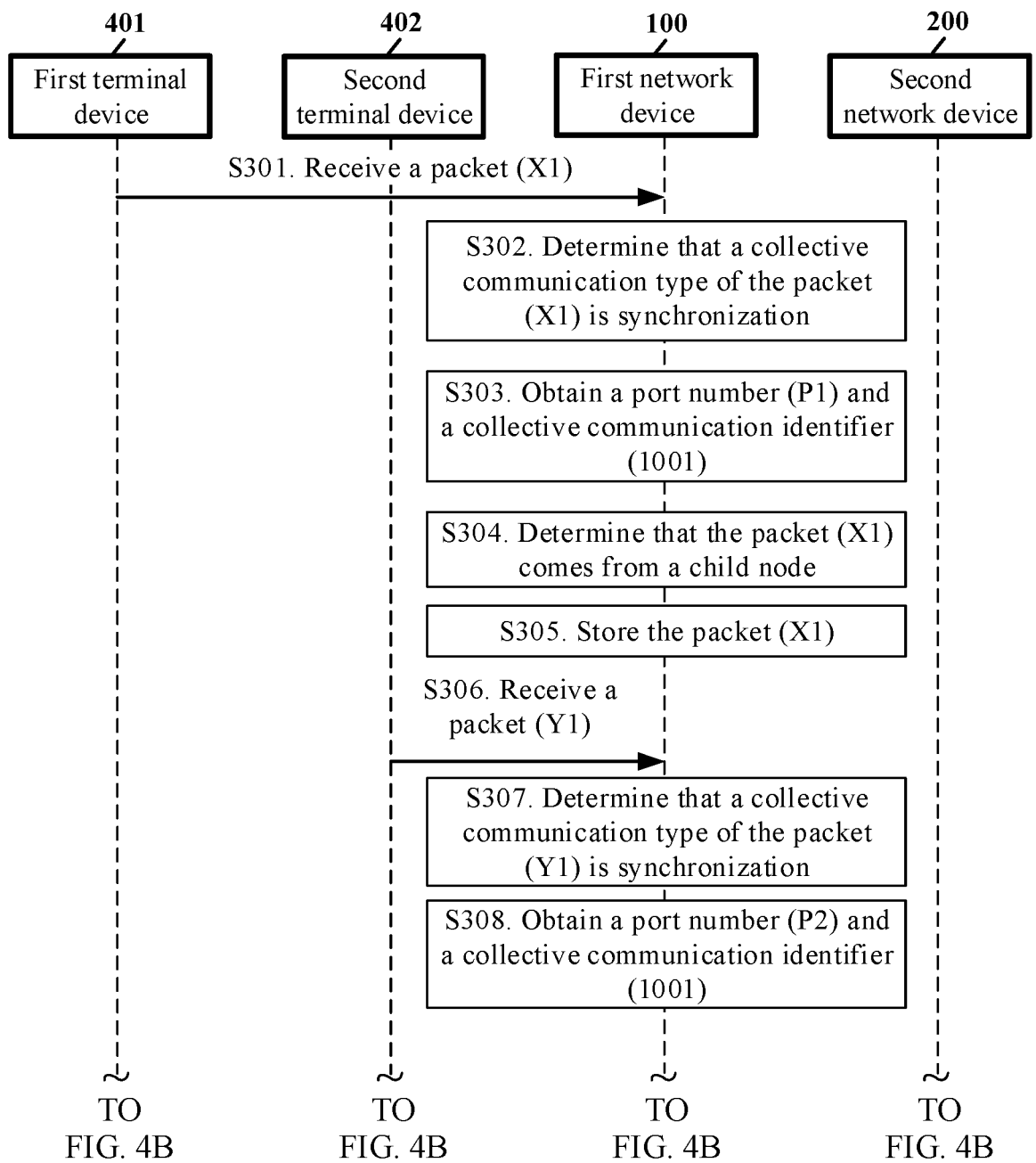
FIG. 4A and FIG. 4B are a flowchart of a method in which a collective communication type of a packet is synchronization according to an embodiment of this application.
Figure 4B:
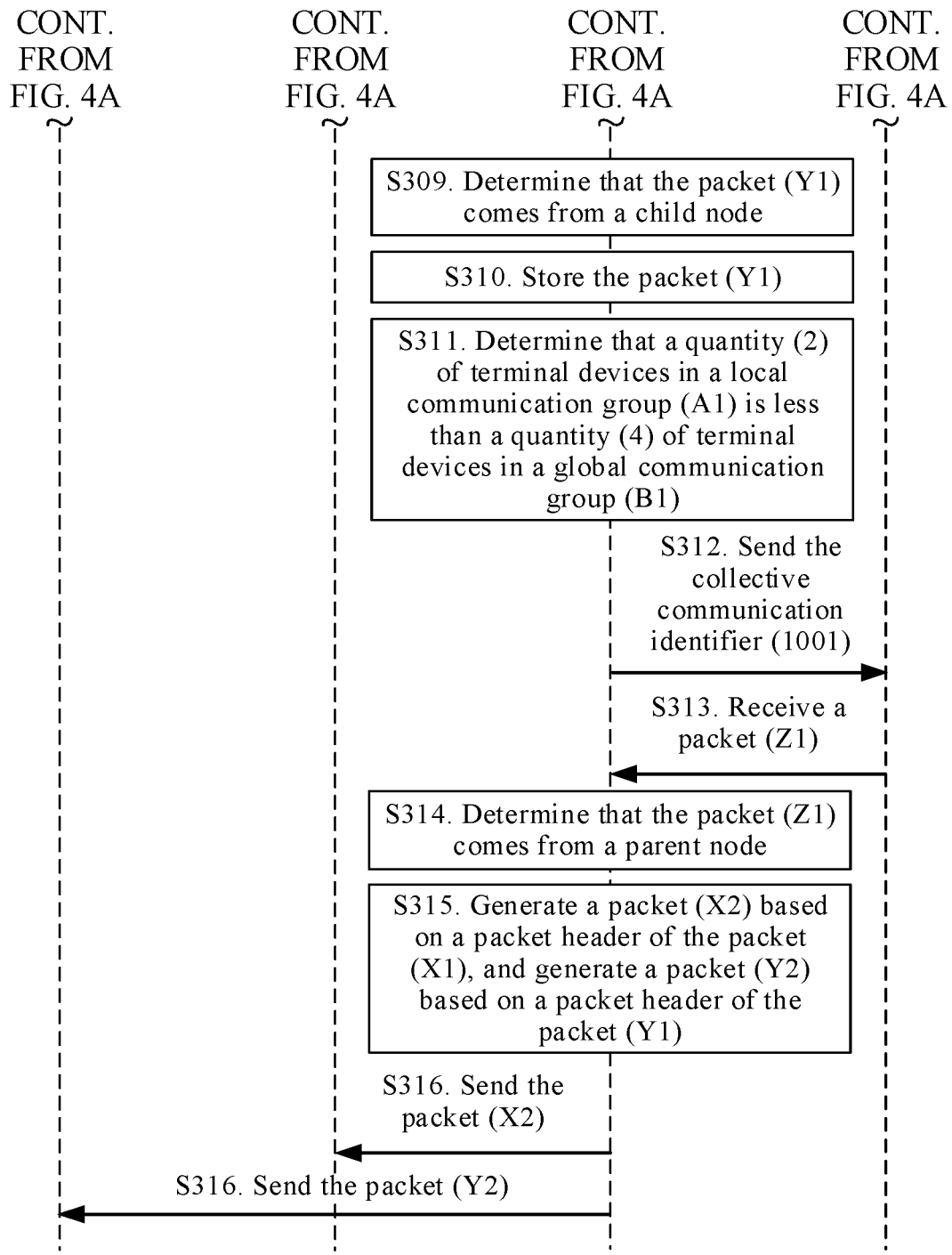

Refer to FIG. 1, FIG. 4A, FIG. 4B, and Table 1. FIG. 4A and FIG. 4B are a flowchart of a method in which a collective communication type of a packet is synchronization according to an embodiment of this application.

In the embodiments shown in FIG. 1, FIG. 4A, FIG. 4B, and Table 1, a local communication group (A1) corresponding to a collective communication identifier (1001) includes a first terminal device 401 and a second terminal device 402. A connection is established between the first terminal device 401 and the second terminal device 402 in advance, and the first terminal device 401 sends a packet (X1) to the second terminal device 402 by using a first network device 100. The collective communication method provided in this embodiment of this application includes the following steps.

Step S301: The first network device 100 receives the packet (X1) sent by the first terminal device 401.

The packet (X1) includes a packet header, a payload, and a check value. The payload is empty. The check value is JYZ1. The packet header of the packet (X1) includes a collective communication identifier, a collective communication field, and a destination address. The collective communication identifier is 1001, the collective communication field is TB, and the destination address is 192.168.1.1. The destination address (192.168.1.1) is an address of the second terminal device 402.

Step S302: The first network device 100 determines, based on the collective communication field (TB) of the packet (X1) and Table 2, that a collective communication type of the packet (X1) is synchronization.

Table 2 shows a table that is of a mapping relationship between a collective communication field and a collective communication type and that is prestored in the first network device 100. After the first network device 100 receives the packet (X1), the first network device 100 extracts the collective communication field (TB) in the packet header of the packet (X1). The first network device 100 determines, based on the collective communication field (TB) and Table 2, that the collective communication type of the packet (X1) is synchronization.

Step S303: The first network device 100 obtains a port number (P 1) corresponding to a port for receiving the packet (X1), and obtains the collective communication identifier (1001) in the packet header of the packet (X1).

The first network device 100 predetermines that a port number corresponding to a port for communicating with the first terminal device 401 is P1, and a port number corresponding to a port for communicating with the second terminal device 402 is P2. After the first network device 100 receives, by using the port (P1), the packet (X1) sent by the first terminal device 401, the first network device 100 may obtain the port number (P1) corresponding to the port for receiving the packet (X1).

Step S304: The first network device 100 may determine, based on the collective communication identifier (1001), the port (P1), and Table 1, that the packet (X1) comes from a child node.

In Table 1, the collective communication identifier (1001) and the port (P1) correspond to a port number of a child node. Therefore, the first network device 100 may determine that the packet (X1) comes from a child node.

Step S305: The first network device 100 stores the packet (X1).

The collective communication type of the packet (X1) is synchronization, and therefore the first network device 100 needs to buffer the packet (X1), so that the first network device 100 may use the packet header of the packet (X1) in a subsequent step.

Step S306: The first network device 100 receives a packet (Y1) sent by the second terminal device 402.

The packet (Y1) includes a packet header, a payload, and a check value. The payload is empty. The check value is JYZ2. The packet header of the packet (Y1) includes a collective communication identifier, a collective communication field, and a destination address. The collective communication identifier is 1001, the collective communication field is TB, and the destination address is 192.168.1.5. The destination address (192.168.1.5) is an address of the first terminal device 401.

Step S307: The first network device 100 determines, based on the collective communication field (TB) of the packet (Y1) and Table 2, that a collective communication type of the packet (Y1) is synchronization.

Step S308: The first network device 100 obtains the port number (P2) corresponding to the port for receiving the packet (Y1), and obtains the collective communication identifier (1001) in the packet header of the packet (Y1).

Step S309: The first network device 100 may determine, based on the collective communication identifier (1001), the port (P2), and Table 1, that the packet (Y1) comes from a child node.

Step S310: The first network device 100 stores the packet (Y1).

Step S311: After the first network device 100 determines that the port corresponding to each of the port numbers (P1 and P2) of the child nodes receives the collective communication packet, the first network device 100 determines, based on Table 1, a quantity (2) of terminal devices in the local communication group (A1) corresponding to the collective communication identifier (1001), and determines, based on Table 1, a quantity (4) of terminal devices in a global communication group (B1) corresponding to the collective communication identifier (1001), and the first network device 100 determines that the quantity (2) of terminal devices in the local communication group (A1) is less than the quantity (4) of terminal devices in the global communication group (B1).

When the quantity (2) of terminal devices in the local communication group (A1) is less than the quantity (4) of terminal devices in the global communication group (B1), it indicates that the first network device 100 further needs to send the collective communication identifier (1001) to a second network device 200.

Step S312: The first network device 100 sends the collective communication identifier (1001) to the second network device 200.

After the second network device 200 receives the collective communication identifier (1001) sent by the first network device 100, the second network device 200 further receives the collective communication identifier (1001) sent by a third network device 300. The second network device 200 then sends a packet (Z1) that includes the collective communication identifier (1001) to the first network device 100, and the second network device 200 sends a packet (Z2) that includes the collective communication identifier (1001) to the third network device 300.

Step S313: The first network device 100 receives the packet (Z1) sent by the second network device 200.

Step S314: The first network device 100 may determine, based on the collective communication identifier (1001) in the packet (Z1), a port (P10) for receiving the packet (Z1), and Table 1, that the packet (Z1) comes from a parent node.

The packet (Z1) includes a packet header, a payload, and a check value. The payload is empty. The check value is JYZ3. The packet header of the packet (Z1) includes a collective communication identifier, and the collective communication identifier is 1001.

Step S315: The first network device 100 generates a packet (X2) based on the packet header of the packet (X1), and the first network device 100 generates a packet (Y2) based on the packet header of the packet (Y1).

A packet header of the packet (X2) is the packet header of the packet (X1), a payload of the packet (X2) is empty, and a check value of the packet (X2) is calculated based on the packet header of the packet (X1). Specifically, the packet (X2) includes the packet header, the payload, and the check value. The payload is empty. The check value is JYZ4. The packet header of the packet (X2) includes a collective communication identifier, a collective communication field, and a destination address. The collective communication identifier is 1001, the collective communication field is TB, and the destination address is 192.168.1.1. The destination address (192.168.1.1) is the address of the second terminal device 402.

A packet header of the packet (Y2) is the packet header of the packet (Y1), a payload of the packet (Y2) is empty, and a check value of the packet (Y2) is calculated based on the packet header of the packet (Y1). Specifically, the packet (Y2) includes the packet header, the payload, and the check value. The payload is empty. The check value is JYZ5. The packet header of the packet (Y2) includes a collective communication identifier, a collective communication field, and a destination address. The collective communication identifier is 1001, the collective communication field is TB, and the destination address is 192.168.1.5. The destination address (192.168.1.5) is the address of the first terminal device 401.

Step S316: The first network device 100 sends the packet (X2) and the packet (Y2).

The destination address (192.168.1.1) in the packet header of the packet (X2) is the address of the second terminal device 402, and the second terminal device 402 receives the packet (X2) sent by the first network device 100. The destination address (192.168.1.5) in the packet header of the packet (Y2) is the address of the first terminal device 401, and the first terminal device 401 receives the packet (Y2) sent by the first network device 100.

In the embodiments shown in FIG. 1, FIG. 4A, FIG. 4B, and Table 1, after the first network device 100 receives the packet (Z1) sent by the second network device 200, the first network device 100 generates the packet (X2) based on the packet header of the packet (X1), and the first network device 100 generates the packet (Y2) based on the packet header of the packet (Y1), and sends the packet (X2) and the packet (Y2), so that the first terminal device 401 and the second terminal device 402 respectively receive the packet (Y2) and the packet (X2). In this embodiment of this application, when no connection is established between the first network device 100 and each of the first terminal device 401 and the second terminal device 402, the first network device 100 may aggregate and distribute collective communication packets by using the connection between the first terminal device 401 and the second terminal device 402. Therefore, the first network device 100 does not need to include a hardware module for establishing a connection to the terminal device, and this reduces hardware investment of the first network device 100. In addition, the first network device 100 does not need to use a state machine to maintain a state of connection established between the first network device 100 and the terminal device. This reduces resource overheads of the first network device 100.

In addition, steps of the third network device 300 are similar to the steps of the first network device 100. For the steps of the third network device 300, refer to the steps of the first network device 100.

In addition, if the local communication group (A1) includes a plurality of terminal devices, for example, if the local communication group (A1) includes terminal devices A, B, C, and D, there are many manners of establishing a connection. For example, a connection is established between the terminal device A and the terminal device B, a connection is established between the terminal device B and the terminal device C, a connection is established between the terminal device C and the terminal device D, and a connection is established between the terminal device D and the terminal device A. Certainly, a communication connection may be alternatively established between the terminal devices in the local communication group (A1) in another manner.

Refer to FIG. 1. If the local communication group (A1) includes one terminal device, for example, if the local communication group (A1) includes the first terminal device 401, and the global communication group (B1) includes the first terminal device 401, a third terminal device 403, and a fourth terminal device 404, there are many manners of establishing a connection. For example, a connection is established between the first terminal device 401 and the third terminal device 403, a connection is established between the third terminal device 403 and the fourth terminal device 404, and a connection is established between the first terminal device 401 and the fourth terminal device 404. In this case, the first network device 100 receives only the packet (X1) sent by the first terminal device 401. If the collective communication type of the packet (X1) is synchronization, and the quantity (1) of terminal devices in the local communication group (A1) is less than the quantity (3) of terminal devices in the global communication group (B1), the first network device 100 sends the collective communication identifier (1001) to the second network device 200.

With reference to FIG. 1 and Table 4, Table 4 shows an information table pre-generated by the first network device 100.

TABLE 4

| Collective communication identifier | Name of a local communication group | Port number of a child node | Port number of a parent node | Quantity of terminal devices in a global communication group |
|---|---|---|---|---|
| 1001 | A1 | P1 and P2 | P10 | 2 |
| ... | ... | ... | ... | ... |

In Table 4, a difference between Table 4 and Table 1 lies in the fifth column. In the fifth column in Table 4, there are two terminal devices, that is, there are two terminal devices in the global communication group B1 corresponding to the collective communication identifier (1001). In the fifth column in Table 1, there are four terminal devices, that is, there are four terminal devices in the global communication group B1 corresponding to the collective communication identifier (1001).

In the embodiments shown in FIG. 1 and Table 4, the collective communication identifier (1001) is an identifier of each of the local communication group (A1) and the global communication group (B1). The local communication group (A1) includes the first terminal device 401 and the second terminal device 402. The global communication group (B1) includes the first terminal device 401 and the second terminal device 402.

In the embodiments shown in FIG. 1 and Table 4, a name of the local communication group is A1, the local communication group (A1) includes the first terminal device 401 and the second terminal device 402, both the first terminal device 401 and the second terminal device 402 correspond to the collective communication identifier (1001), and both the first terminal device 401 and the second terminal device 402 communicate with the first network device 100.

In the embodiments shown in FIG. 1 and Table 4, port numbers of child nodes include P1 and P2. A port corresponding to the port number P1 is a port through which the first network device 100 communicates with the first terminal device 401. A port corresponding to the port number P2 is a port through which the first network device 100 communicates with the second terminal device 402.

In the embodiments shown in FIG. 1 and Table 4, the port number of the parent node includes P10. A port corresponding to the port number P10 is a port through which the first network device 100 communicates with the second network device 200.

In the embodiments shown in FIG. 1 and Table 4, terminal devices corresponding to the collective communication identifier (1001) include the first terminal device 401 and the second terminal device 402, there are two terminal devices in the global communication groups (B1), and the global communication group (B1) includes the first terminal device 401 and the second terminal device 402.

In the embodiments shown in FIG. 1 and Table 4, the local communication group (A1) includes the first terminal device 401 and the second terminal device 402. A connection is established between the first terminal device 401 and the second terminal device 402, and therefore the first network device 100 may aggregate and distribute collective communication packets by using the connection between the first terminal device 401 and the second terminal device 402, and no hardware module for establishing a connection to each of the first terminal device 401 and the second terminal device 402 needs to be disposed on the first network device 100. A situation of the third network device 300 is similar to that of the first network device 100. For the situation of the third network device 300, refer to the detailed description of the first network device 100.

Figure 5:
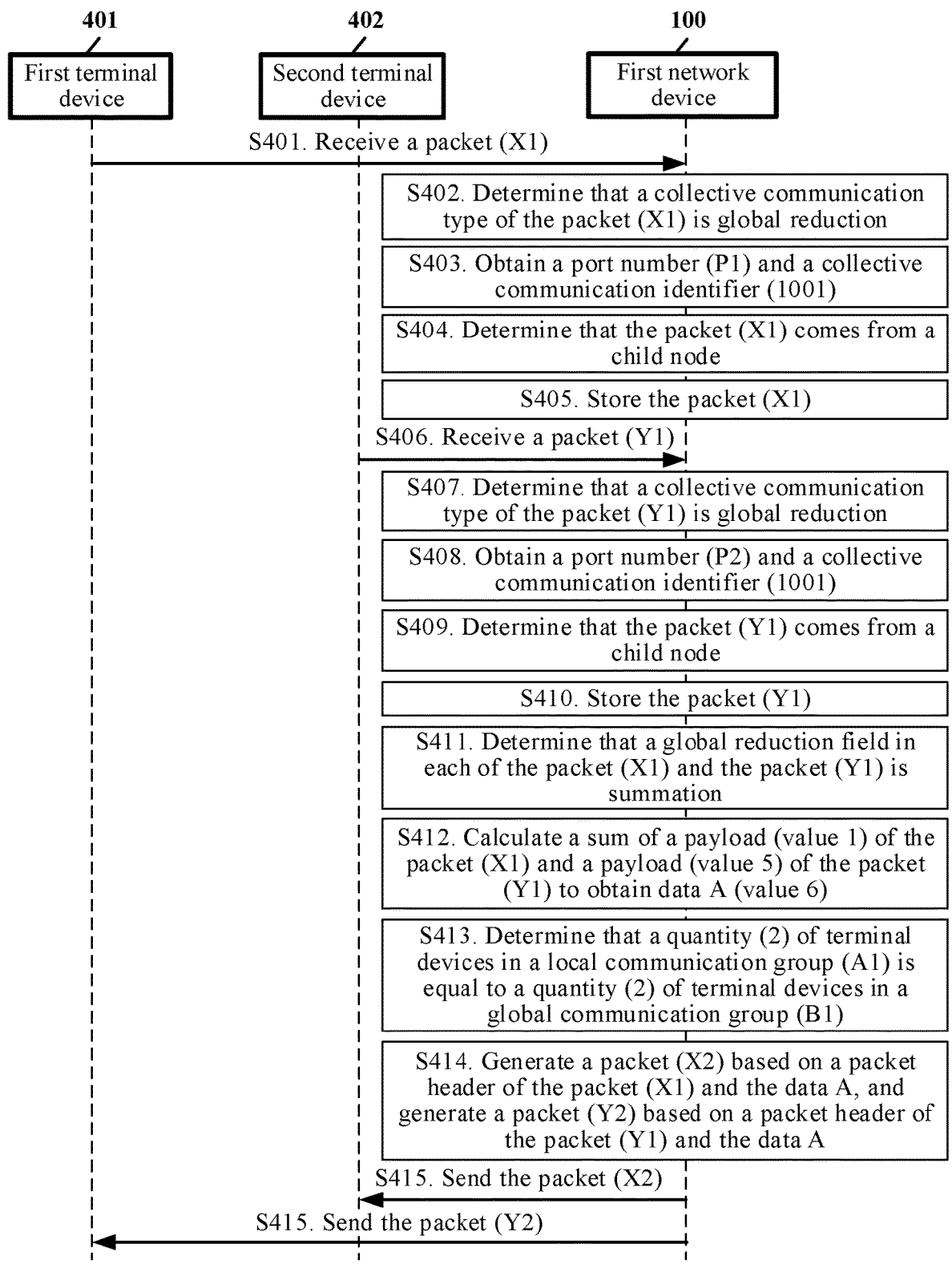
FIG. 5 is a flowchart of a method in which a collective communication type of a packet is global reduction according to an embodiment of this application.

Refer to FIG. 1, FIG. 5, and Table 4. FIG. 5 is a flowchart of a method in which a collective communication type of a packet is global reduction according to an embodiment of this application.

In the embodiments shown in FIG. 1, FIG. 5, and Table 4, a local communication group (A1) corresponding to a collective communication identifier (1001) includes a first terminal device 401 and a second terminal device 402. A connection is established between the first terminal device 401 and the second terminal device 402 in advance, and the first terminal device 401 sends a packet (X1) to the second terminal device 402 by using a first network device 100. The collective communication method provided in this embodiment of this application includes the following steps.

Step S401: The first network device 100 receives the packet (X1) sent by the first terminal device 401.

The packet (X1) includes a packet header, a payload, and a check value. The payload includes a value 1. The check value is JYZ1. The packet header of the packet (X1) includes a collective communication identifier, a collective communication field, and a destination address. The collective communication identifier is 1001, the collective communication field is QJGY, and the destination address is 192.168.1.1. The destination address (192.168.1.1) is an address of the second terminal device 402.

Step S402: The first network device 100 determines, based on the collective communication field (QJGY) of the packet (X1) and Table 2, that a collective communication type of the packet (X1) is global reduction.

Table 2 shows a table that is of a mapping relationship between a collective communication field and a collective communication type and that is prestored in the first network device 100. After the first network device 100 receives the packet (X1), the first network device 100 extracts the collective communication field (QJGY) in the packet header of the packet (X1). The first network device 100 determines, based on the collective communication field (QJGY) and Table 2, that the collective communication type of the packet (X1) is global reduction.

Step S403: The first network device 100 obtains a port number (P1) corresponding to a port for receiving the packet (X1), and obtains the collective communication identifier (1001) in the packet header of the packet (X1).

The first network device 100 predetermines that a port number corresponding to a port for communicating with the first terminal device 401 is P1, and a port number corresponding to a port for communicating with the second terminal device 402 is P2. After the first network device 100 receives, by using the port (P1), the packet (X1) sent by the first terminal device 401, the first network device 100 may obtain the port number (P1) corresponding to the port for receiving the packet (X1).

Step S404: The first network device 100 may determine, based on the collective communication identifier (1001), the port (P1), and Table 4, that the packet (X1) comes from a child node.

In Table 4, the collective communication identifier (1001) and the port (P1) correspond to a port number of a child node. Therefore, the first network device 100 may determine that the packet (X1) comes from a child node.

Step S405: The first network device 100 stores the packet (X1).

The collective communication type of the packet (X1) is global reduction, and therefore the first network device 100 needs to buffer the packet (X1), so that the first network device 100 may use the packet header of the packet (X1) in a subsequent step.

Step S406: The first network device 100 receives a packet (Y1) sent by the second terminal device 402.

The packet (Y1) includes a packet header, a payload, and a check value. The payload includes a value 5. The check value is JYZ2. The packet header of the packet (Y1) includes a collective communication identifier, a collective communication field, and a destination address. The collective communication identifier is 1001, the collective communication field is QJGY, and the destination address is 192.168.1.5. The destination address (192.168.1.5) is an address of the first terminal device 401.

Step S407: The first network device 100 determines, based on the collective communication field (QJGY) of the packet (Y1) and Table 2, that a collective communication type of the packet (Y1) is global reduction.

Step S408: The first network device 100 obtains the port number (P2) corresponding to the port for receiving the packet (Y1), and obtains the collective communication identifier (1001) in the packet header of the packet (Y1).

Step S409: The first network device 100 may determine, based on the collective communication identifier (1001), the port (P2), and Table 4, that the packet (Y1) comes from a child node.

Step S410: The first network device 100 stores the packet (Y1).

Step S411: After the first network device 100 determines that the port corresponding to each of the port numbers (P1 and P2) of the child nodes receives the collective communication packet, the first network device 100 determines that a global reduction field in each of the packet (X1) and the packet (Y1) is summation.

There are a plurality of types of global reduction fields in a packet header of a packet. For example, the global reduction field may be summation, a maximum value, or a minimum value.

Step S412: The first network device 100 extracts the payload (value 1) of the packet (X1) and the payload (value 5) of the packet (Y1), and the first network device 100 calculates a sum of the payload (value 1) of the packet (X1) and the payload (value 5) of the packet (Y1) to obtain data A (value 6).

The payload of the packet (X1) is the value 1, the payload of the packet (Y1) is the value 5, and the data A=the payload (value 1) of the packet (X1)+the payload (value 5) of the packet (Y1)=1+5=6.

Step S413: The first network device 100 determines, based on Table 4, a quantity (2) of terminal devices in the local communication group (A1) corresponding to the collective communication identifier (1001), and determines, based on Table 4, a quantity (2) of terminal devices in a global communication group (B1) corresponding to the collective communication identifier (1001), and the first network device 100 determines that the quantity (2) of terminal devices in the local communication group (A1) is equal to the quantity (2) of terminal devices in the global communication group (B1).

When the quantity (2) of terminal devices in the local communication group (A1) is equal to the quantity (2) of terminal devices in the global communication group (B1), it indicates that the first network device 100 does not need to send the data A to a second network device 200.

Step S414: The first network device 100 generates a packet (X2) based on the packet header of the packet (X1) and the data A, and the first network device 100 generates a packet (Y2) based on the packet header of the packet (Y1) and the data A.

A packet header of the packet (X2) is the packet header of the packet (X1), a payload of the packet (X2) is the data A, and a check value of the packet (X2) is calculated based on the packet header of the packet (X1) and the data A. Specifically, the packet (X2) includes the packet header, the payload, and the check value. The payload includes the value 6. The check value is JYZ4. The packet header of the packet (X2) includes a collective communication identifier, a collective communication field, and a destination address. The collective communication identifier is 1001, the collective communication field is QJGY, and the destination address is 192.168.1.1. The destination address (192.168.1.1) is the address of the second terminal device 402.

A packet header of the packet (Y2) is the packet header of the packet (Y1), a payload of the packet (Y2) is the data A, and a check value of the packet (Y2) is calculated based on the packet header of the packet (Y1) and the data A. Specifically, the packet (Y2) includes the packet header, the payload, and the check value. The payload includes the value 6. The check value is JYZ5. The packet header of the packet (Y2) includes a collective communication identifier, a collective communication field, and a destination address. The collective communication identifier is 1001, the collective communication field is QJGY, and the destination address is 192.168.1.5. The destination address (192.168.1.5) is the address of the first terminal device 401.

The payload of the packet (X2) is the value 6, and the payload of the packet (X1) is the value 1. Therefore, the payload of the packet (X2) is different from the payload of the packet (X1). The payload of the packet (X2) is different from the payload of the packet (X1), and the check value is calculated based on the packet header of the packet and the payload of the packet. Therefore, the check value of the packet (X2) is different from the check value of the packet (X1). The payload of the packet (Y2) is the value 6, and the payload of the packet (Y1) is the value 5. Therefore, the payload of the packet (Y2) is different from the payload of the packet (Y1). The payload of the packet (Y2) is different from the payload of the packet (Y1), and the check value is calculated based on the packet header of the packet and the payload of the packet. Therefore, the check value of the packet (Y2) is different from the check value of the packet (Y1).

Step S415: The first network device 100 sends the packet (X2) and the packet (Y2).

The destination address (192.168.1.1) in the packet header of the packet (X2) is the address of the second terminal device 402, and the second terminal device 402 receives the packet (X2) sent by the first network device 100. The destination address (192.168.1.5) in the packet header of the packet (Y2) is the address of the first terminal device 401, and the first terminal device 401 receives the packet (Y2) sent by the first network device 100.

In the embodiments shown in FIG. 1, FIG. 5, and Table 4, after the first network device 100 obtains a final global reduction result (value 6), the first network device 100 generates the packet (X2) by using the packet header of the packet (X1) and the final global reduction result (value 6), generates the packet (Y2) by using the packet header of the packet (Y1) and the final global reduction result (value 6), and sends the packet (X2) and the packet (Y2), so that the first terminal device 401 and the second terminal device 402 respectively receive the packet (Y2) and the packet (X2). In this embodiment of this application, when no connection is established between the first network device 100 and each of the first terminal device 401 and the second terminal device 402, the first network device 100 may aggregate and distribute collective communication packets by using the connection between the first terminal device 401 and the second terminal device 402. Therefore, the first network device 100 does not need to include a hardware module for establishing a connection to the terminal device, and this reduces hardware investment of the first network device 100. In addition, the first network device 100 does not need to use a state machine to maintain a state of connection established between the first network device 100 and the terminal device. This reduces resource overheads of the first network device 100.

In addition, steps of the third network device 300 are similar to the steps of the first network device 100. For the steps of the third network device 300, refer to the steps of the first network device 100.

In addition, if the local communication group (A1) includes a plurality of terminal devices, for example, if the local communication group (A1) includes terminal devices A, B, C, and D, there are many manners of establishing a connection. For example, a connection is established between the terminal device A and the terminal device B, a connection is established between the terminal device B and the terminal device C, a connection is established between the terminal device C and the terminal device D, and a connection is established between the terminal device D and the terminal device A. Certainly, a communication connection may be alternatively established between the terminal devices in the local communication group (A1) in another manner.

Figure 6:
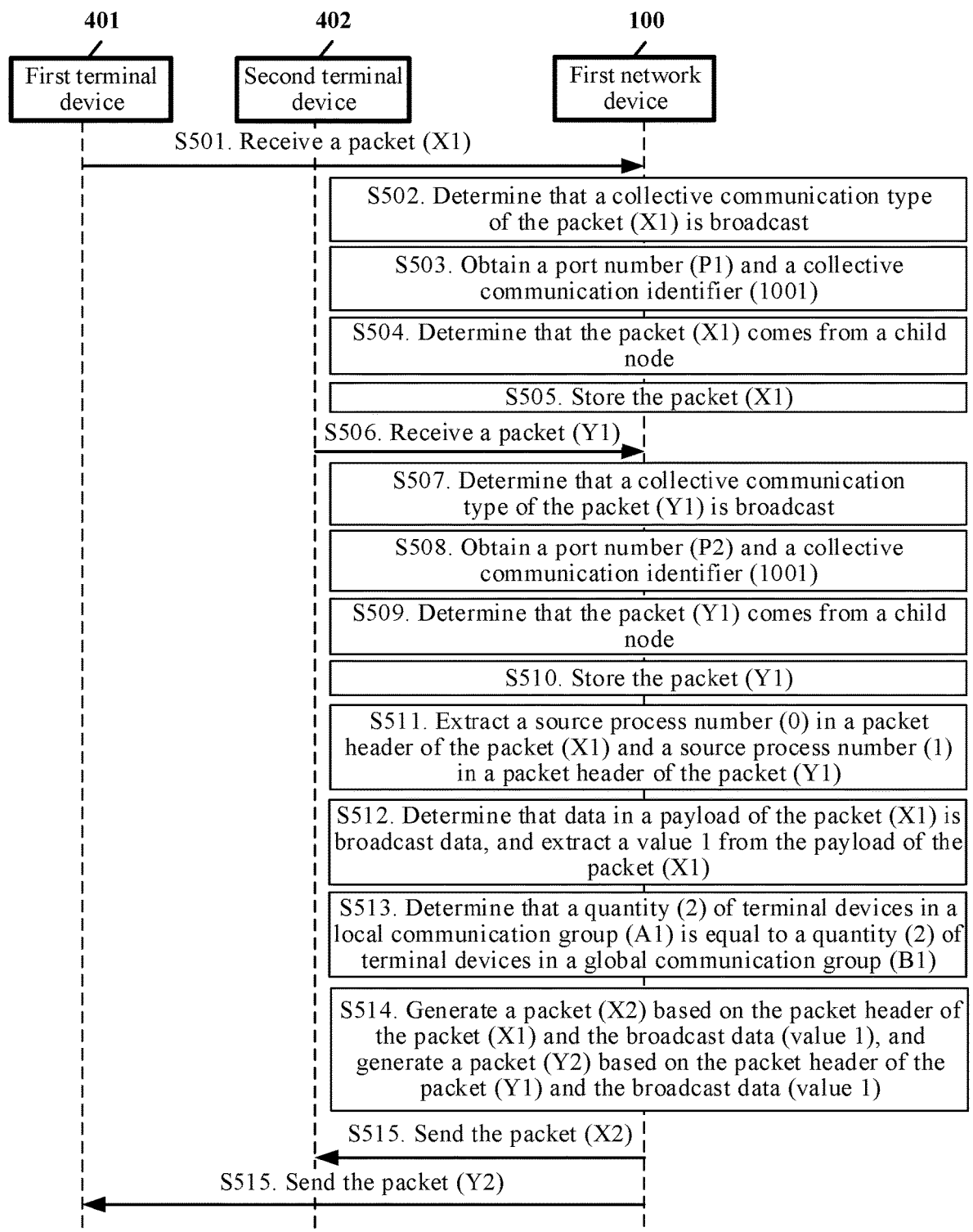
FIG. 6 is a flowchart of a method in which a collective communication type of a packet is broadcast according to an embodiment of this application.

Refer to FIG. 1, FIG. 6, and Table 4. FIG. 6 is a flowchart of a method in which a collective communication type of a packet is broadcast according to an embodiment of this application.

In the embodiments shown in FIG. 1, FIG. 6, and Table 4, a local communication group (A1) corresponding to a collective communication identifier (1001) includes a first terminal device 401 and a second terminal device 402. A connection is established between the first terminal device 401 and the second terminal device 402 in advance, and the first terminal device 401 sends a packet (X1) to the second terminal device 402 by using a first network device 100. The collective communication method provided in this embodiment of this application includes the following steps.

Step S501: The first network device 100 receives the packet (X1) sent by the first terminal device 401.

The packet (X1) includes a packet header, a payload, and a check value. The payload includes a value 1. The check value is JYZ1. The packet header of the packet (X1) includes a collective communication identifier, a collective communication field, and a destination address. The collective communication identifier is 1001, the collective communication field is GB, and the destination address is 192.168.1.1. The destination address (192.168.1.1) is an address of the second terminal device 402.

Step S502: The first network device 100 determines, based on the collective communication field (GB) of the packet (X1) and Table 2, that a collective communication type of the packet (X1) is broadcast.

Table 2 shows a table that is of a mapping relationship between a collective communication field and a collective communication type and that is prestored in the first network device 100. After the first network device 100 receives the packet (X1), the first network device 100 extracts the collective communication field (GB) in the packet header of the packet (X1). The first network device 100 determines, based on the collective communication field (GB) and Table 2, that the collective communication type of the packet (X1) is broadcast.

Step S503: The first network device 100 obtains a port number (P1) corresponding to a port for receiving the packet (X1), and obtains the collective communication identifier (1001) in the packet header of the packet (X1).

The first network device 100 predetermines that a port number corresponding to a port for communicating with the first terminal device 401 is P1, and a port number corresponding to a port for communicating with the second terminal device 402 is P2. After the first network device 100 receives, by using the port (P1), the packet (X1) sent by the first terminal device 401, the first network device 100 may obtain the port number (P1) corresponding to the port for receiving the packet (X1).

Step S504: The first network device 100 may determine, based on the collective communication identifier (1001), the port (P1), and Table 4, that the packet (X1) comes from a child node.

In Table 4, the collective communication identifier (1001) and the port (P1) correspond to a port number of a child node. Therefore, the first network device 100 may determine that the packet (X1) comes from a child node.

Step S505: The first network device 100 stores the packet (X1).

The collective communication type of the packet (X1) is broadcast, and therefore the first network device 100 needs to buffer the packet (X1), so that the first network device 100 may use the packet header of the packet (X1) in a subsequent step.

Step S506: The first network device 100 receives a packet (Y1) sent by the second terminal device 402.

The packet (Y1) includes a packet header, a payload, and a check value. The payload includes a value 5. The check value is JYZ2. The packet header of the packet (Y1) includes a collective communication identifier, a collective communication field, and a destination address. The collective communication identifier is 1001, the collective communication field is GB, and the destination address is 192.168.1.5. The destination address (192.168.1.5) is an address of the first terminal device 401.

Step S507: The first network device 100 determines, based on the collective communication field (GB) of the packet (Y1) and Table 2, that a collective communication type of the packet (Y1) is broadcast.

Step S508: The first network device 100 obtains the port number (P2) corresponding to the port for receiving the packet (Y1), and obtains the collective communication identifier (1001) in the packet header of the packet (Y1).

Step S509: The first network device 100 may determine, based on the collective communication identifier (1001), the port (P2), and Table 4, that the packet (Y1) comes from a child node.

Step S510: The first network device 100 stores the packet (Y1).

Step S511: After the first network device 100 determines that the port corresponding to each of the port numbers (P1 and P2) of the child nodes receives the collective communication packet, the first network device 100 extracts a source process number (0) in the packet header of the packet (X1) and a source process number (1) in the packet header of the packet (Y1).

Step S512: The first network device 100 determines, based on Table 3, the source process number (0) in the packet header of the packet (X1), and the source process number (1) in the packet header of the packet (Y1), that data in the payload of the packet (X1) is broadcast data, and extracts the value 1 from the payload of the packet (X1), where the value 1 is the broadcast data.

Step S513: The first network device 100 determines, based on Table 4, a quantity (2) of terminal devices in the local communication group (A1) corresponding to the collective communication identifier (1001), and determines, based on Table 4, a quantity (2) of terminal devices in a global communication group (B1) corresponding to the collective communication identifier (1001), and the first network device 100 determines that the quantity (2) of terminal devices in the local communication group (A1) is equal to the quantity (2) of terminal devices in the global communication group (B1).

When the quantity (2) of terminal devices in the local communication group (A1) is equal to the quantity (2) of terminal devices in the global communication group (B1), it indicates that the first network device 100 does not need to send the broadcast data (value 1) to a second network device 200.

Step S514: The first network device 100 generates a packet (X2) based on the packet header of the packet (X1) and the broadcast data (value 1), and the first network device 100 generates a packet (Y2) based on the packet header of the packet (Y1) and the broadcast data (value 1).

A packet header of the packet (X2) is the packet header of the packet (X1), a payload of the packet (X2) is the broadcast data (value 1), and a check value of the packet (X2) is calculated based on the packet header of the packet (X1) and the broadcast data (value 1). Specifically, the packet (X2) includes the packet header, the payload, and the check value. The payload includes the value 1. The check value is JYZ4. The packet header of the packet (X2) includes a collective communication identifier, a collective communication field, and a destination address. The collective communication identifier is 1001, the collective communication field is GB, and the destination address is 192.168.1.1. The destination address (192.168.1.1) is the address of the second terminal device 402.

A packet header of the packet (Y2) is the packet header of the packet (Y1), a payload of the packet (Y2) is the broadcast data (value 1), and a check value of the packet (Y2) is calculated based on the packet header of the packet (Y1) and the broadcast data (value 1). Specifically, the packet (Y2) includes the packet header, the payload, and the check value. The payload includes the value 1. The check value is JYZ5. The packet header of the packet (Y2) includes a collective communication identifier, a collective communication field, and a destination address. The collective communication identifier is 1001, the collective communication field is GB, and the destination address is 192.168.1.5. The destination address (192.168.1.5) is the address of the first terminal device 401.

The payload of the packet (X2) is the value 1, and the payload of the packet (X1) is the value 1. Therefore, the payload of the packet (X2) is the same as the payload of the packet (X1). The payload of the packet (X2) is the same as the payload of the packet (X1), the packet header of the packet (X2) is the same as the packet header of the packet (X1), and the check value is calculated based on the packet header of the packet and the payload of the packet. Therefore, the check value of the packet (X2) is the same as the check value of the packet (X1). The payload of the packet (Y2) is the value 1, and the payload of the packet (Y1) is the value 5. Therefore, the payload of the packet (Y2) is different from the payload of the packet (Y1). The payload of the packet (Y2) is different from the payload of the packet (Y1), and the check value is calculated based on the packet header of the packet and the payload of the packet. Therefore, the check value of the packet (Y2) is different from the check value of the packet (Y1).

Step S515: The first network device 100 sends the packet (X2) and the packet (Y2).

The destination address (192.168.1.1) in the packet header of the packet (X2) is the address of the second terminal device 402, and the second terminal device 402 receives the packet (X2) sent by the first network device 100. The destination address (192.168.1.5) in the packet header of the packet (Y2) is the address of the first terminal device 401, and the first terminal device 401 receives the packet (Y2) sent by the first network device 100.

In the embodiments shown in FIG. 1, FIG. 6, and Table 4, after the first network device 100 obtains the broadcast data (value 1), the first network device 100 generates the packet (X2) by using the packet header of the packet (X1) and the broadcast data (value 1), generates the packet (Y2) by using the packet header of the packet (Y1) and the broadcast data (value 1), and sends the packet (X2) and the packet (Y2), so that the first terminal device 401 and the second terminal device 402 respectively receive the packet (Y2) and the packet (X2). In this embodiment of this application, when no connection is established between the first network device 100 and each of the first terminal device 401 and the second terminal device 402, the first network device 100 may aggregate and distribute collective communication packets by using the connection between the first terminal device 401 and the second terminal device 402. Therefore, the first network device 100 does not need to include a hardware module for establishing a connection to the terminal device, and this reduces hardware investment of the first network device 100. In addition, the first network device 100 does not need to use a state machine to maintain a state of connection established between the first network device 100 and the terminal device. This reduces resource overheads of the first network device 100.

In addition, steps of the third network device 300 are similar to the steps of the first network device 100. For the steps of the third network device 300, refer to the steps of the first network device 100.

In addition, if the local communication group (A1) includes a plurality of terminal devices, for example, if the local communication group (A1) includes terminal devices A, B, C, and D, there are many manners of establishing a connection. For example, a connection is established between the terminal device A and the terminal device B, a connection is established between the terminal device B and the terminal device C, a connection is established between the terminal device C and the terminal device D, and a connection is established between the terminal device D and the terminal device A. Certainly, a communication connection may be alternatively established between the terminal devices in the local communication group (A1) in another manner.

Figure 7:
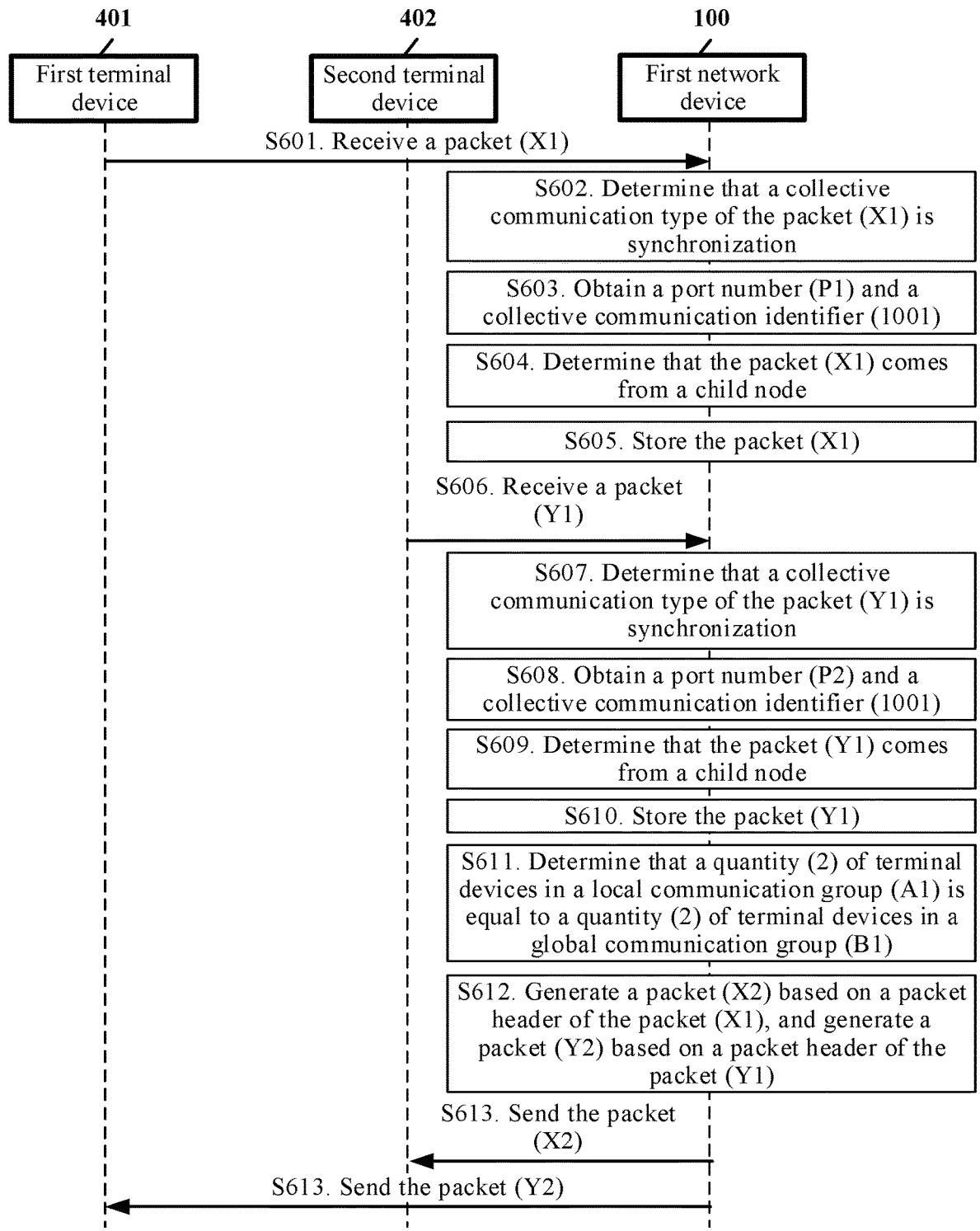
FIG. 7 is a flowchart of a method in which a collective communication type of a packet is synchronization according to an embodiment of this application.

Refer to FIG. 1, FIG. 7, and Table 4. FIG. 7 is a flowchart of a method in which a collective communication type of a packet is synchronization according to an embodiment of this application.

In the embodiments shown in FIG. 1, FIG. 7, and Table 4, a local communication group (A1) corresponding to a collective communication identifier (1001) includes a first terminal device 401 and a second terminal device 402. A connection is established between the first terminal device 401 and the second terminal device 402 in advance, and the first terminal device 401 sends a packet (X1) to the second terminal device 402 by using a first network device 100. The collective communication method provided in this embodiment of this application includes the following steps.

Step S601: The first network device 100 receives the packet (X1) sent by the first terminal device 401.

The packet (X1) includes a packet header, a payload, and a check value. The payload is empty. The check value is JYZ1. The packet header of the packet (X1) includes a collective communication identifier, a collective communication field, and a destination address. The collective communication identifier is 1001, the collective communication field is TB, and the destination address is 192.168.1.1. The destination address (192.168.1.1) is an address of the second terminal device 402.

Step S602: The first network device 100 determines, based on the collective communication field (TB) of the packet (X1) and Table 2, that a collective communication type of the packet (X1) is synchronization.

Table 2 shows a table that is of a mapping relationship between a collective communication field and a collective communication type and that is prestored in the first network device 100. After the first network device 100 receives the packet (X1), the first network device 100 extracts the collective communication field (TB) in the packet header of the packet (X1). The first network device 100 determines, based on the collective communication field (TB) and Table 2, that the collective communication type of the packet (X1) is synchronization.

Step S603: The first network device 100 obtains a port number (P1) corresponding to a port for receiving the packet (X1), and obtains the collective communication identifier (1001) in the packet header of the packet (X1).

The first network device 100 predetermines that a port number corresponding to a port for communicating with the first terminal device 401 is P1, and a port number corresponding to a port for communicating with the second terminal device 402 is P2. After the first network device 100 receives, by using the port (P1), the packet (X1) sent by the first terminal device 401, the first network device 100 may obtain the port number (P1) corresponding to the port for receiving the packet (X1).

Step S604: The first network device 100 may determine, based on the collective communication identifier (1001), the port (P1), and Table 4, that the packet (X1) comes from a child node.

In Table 4, the collective communication identifier (1001) and the port (P1) correspond to a port number of a child node. Therefore, the first network device 100 may determine that the packet (X1) comes from a child node.

Step S605: The first network device 100 stores the packet (X1).

The collective communication type of the packet (X1) is synchronization, and therefore the first network device 100 needs to buffer the packet (X1), so that the first network device 100 may use the packet header of the packet (X1) in a subsequent step.

Step S606: The first network device 100 receives a packet (Y1) sent by the second terminal device 402.

The packet (Y1) includes a packet header, a payload, and a check value. The payload is empty. The check value is JYZ2. The packet header of the packet (Y1) includes a collective communication identifier, a collective communication field, and a destination address. The collective communication identifier is 1001, the collective communication field is TB, and the destination address is 192.168.1.5. The destination address (192.168.1.5) is an address of the first terminal device 401.

Step S607: The first network device 100 determines, based on the collective communication field (TB) of the packet (Y1) and Table 2, that a collective communication type of the packet (Y1) is synchronization.

Step S608: The first network device 100 obtains the port number (P2) corresponding to the port for receiving the packet (Y1), and obtains the collective communication identifier (1001) in the packet header of the packet (Y1).

Step S609: The first network device 100 may determine, based on the collective communication identifier (1001), the port (P2), and Table 4, that the packet (Y1) comes from a child node.

Step S610: The first network device 100 stores the packet (Y1).

Step S611: After the first network device 100 determines that the port corresponding to each of the port numbers (P1 and P2) of the child nodes receives the collective communication packet, the first network device 100 determines, based on Table 4, a quantity (2) of terminal devices in the local communication group (A1) corresponding to the collective communication identifier (1001), and determines, based on Table 4, a quantity (2) of terminal devices in a global communication group (B1) corresponding to the collective communication identifier (1001), and the first network device 100 determines that the quantity (2) of terminal devices in the local communication group (A1) is equal to the quantity (2) of terminal devices in the global communication group (B1).

When the quantity (2) of terminal devices in the local communication group (A1) is equal to the quantity (2) of terminal devices in the global communication group (B1), it indicates that the first network device 100 does not need to send the collective communication identifier (1001) to a second network device 200.

Step S612: The first network device 100 generates a packet (X2) based on the packet header of the packet (X1), and the first network device 100 generates a packet (Y2) based on the packet header of the packet (Y1).

A packet header of the packet (X2) is the packet header of the packet (X1), a payload of the packet (X2) is empty, and a check value of the packet (X2) is calculated based on the packet header of the packet (X1). Specifically, the packet (X2) includes the packet header, the payload, and the check value. The payload is empty. The check value is JYZ4. The packet header of the packet (X2) includes a collective communication identifier, a collective communication field, and a destination address. The collective communication identifier is 1001, the collective communication field is TB, and the destination address is 192.168.1.1. The destination address (192.168.1.1) is the address of the second terminal device 402.

A packet header of the packet (Y2) is the packet header of the packet (Y1), a payload of the packet (Y2) is empty, and a check value of the packet (Y2) is calculated based on the packet header of the packet (Y1). Specifically, the packet (Y2) includes the packet header, the payload, and the check value. The payload is empty. The check value is JYZ5. The packet header of the packet (Y2) includes a collective communication identifier, a collective communication field, and a destination address. The collective communication identifier is 1001, the collective communication field is TB, and the destination address is 192.168.1.5. The destination address (192.168.1.5) is the address of the first terminal device 401.

Step S613: The first network device 100 sends the packet (X2) and the packet (Y2).

The destination address (192.168.1.1) in the packet header of the packet (X2) is the address of the second terminal device 402, and the second terminal device 402 receives the packet (X2) sent by the first network device 100. The destination address (192.168.1.5) in the packet header of the packet (Y2) is the address of the first terminal device 401, and the first terminal device 401 receives the packet (Y2) sent by the first network device 100.

In the embodiments shown in FIG. 1, FIG. 7, and Table 4, after the first network device 100 determines that the quantity (2) of terminal devices in the local communication group (A1) is equal to the quantity (2) of terminal devices in the global communication group (B1), the first network device 100 generates the packet (X2) based on the packet header of the packet (X1), and the first network device 100 generates the packet (Y2) based on the packet header of the packet (Y1), and sends the packet (X2) and the packet (Y2), so that the first terminal device 401 and the second terminal device 402 respectively receive the packet (Y2) and the packet (X2). In this embodiment of this application, when no connection is established between the first network device 100 and each of the first terminal device 401 and the second terminal device 402, the first network device 100 may aggregate and distribute collective communication packets by using the connection between the first terminal device 401 and the second terminal device 402. Therefore, the first network device 100 does not need to include a hardware module for establishing a connection to the terminal device, and this reduces hardware investment of the first network device 100. In addition, the first network device 100 does not need to use a state machine to maintain a state of connection established between the first network device 100 and the terminal device. This reduces resource overheads of the first network device 100.

In addition, steps of the third network device 300 are similar to the steps of the first network device 100. For the steps of the third network device 300, refer to the steps of the first network device 100.

In addition, if the local communication group (A1) includes a plurality of terminal devices, for example, if the local communication group (A1) includes terminal devices A, B, C, and D, there are many manners of establishing a connection. For example, a connection is established between the terminal device A and the terminal device B, a connection is established between the terminal device B and the terminal device C, a connection is established between the terminal device C and the terminal device D, and a connection is established between the terminal device D and the terminal device A. Certainly, a communication connection may be alternatively established between the terminal devices in the local communication group (A1) in another manner.

In the embodiments shown in FIG. 1 to FIG. 7, if the first network device 100 is in a remote direct memory access over converged Ethernet (RDMA over converged Ethernet, RoCE) network, the destination address in the packet header of the packet (X1) is a destination media access control (media access control, MAC) address. In addition, a first field of the packet (X1) is the same as a first field of the packet (X2). The first field includes at least one of a source MAC address, a source global identifier (global identifier, GID) in a global route header (global route header, GRH), a destination global identifier in a global route header, or a destination queue pair (queue pair, QP) number in a base transport header (base transport header, BTH).

In the embodiments shown in FIG. 1 to FIG. 7, if the first network device 100 is in an internet protocol routable remote direct memory access over converged Ethernet (IP routable RDMA over converged Ethernet, RoCEv2) network, the destination address in the packet header of the packet (X1) is a destination internet protocol (internet protocol, IP) address. In addition, a second field of the packet (X1) is the same as a second field of the packet (X2). The second field includes at least one of a source IP address, a user datagram protocol (user datagram protocol, UDP) source port number, or a destination queue pair number in an infiniband (infiniband, IB) transport header.

In the embodiments shown in FIG. 1 to FIG. 7, if the first network device 100 is in an infiniband (infiniband, IB) network, the destination address in the packet header of the packet (X1) is a destination local identifier (local identifier, LID) address. In addition, a third field of the packet (X1) is the same as a third field of the packet (X2). The third field includes at least one of a source local identifier address or a destination queue pair number in a base transport header.

Figure 8:
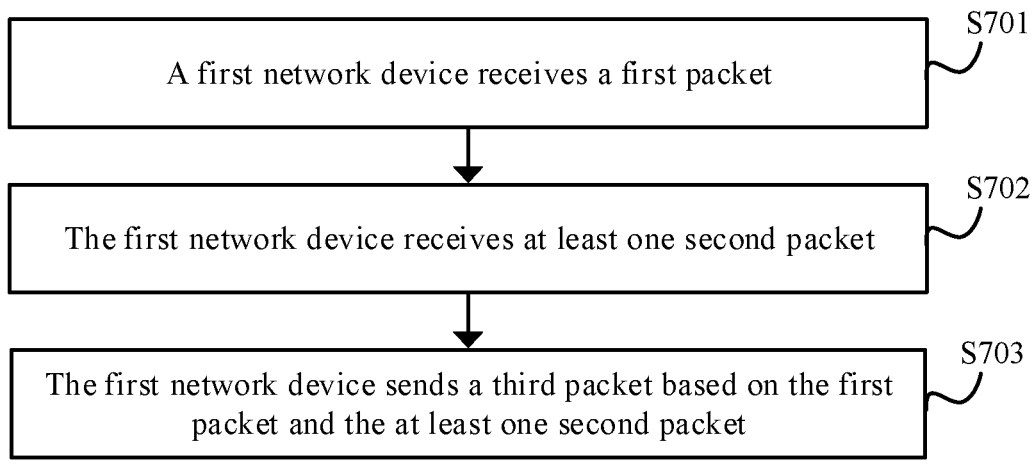
FIG. 8 is a flowchart of a collective communication method according to an embodiment of this application.

FIG. 8 is a flowchart of a collective communication method according to an embodiment of this application. The method shown in FIG. 8 includes the following steps.

Step S701: A first network device receives a first packet.

The first packet includes a first collective communication identifier and a first destination address. The first destination address is an address of a first terminal device, and the first packet is a packet sent by a terminal device in a local communication group corresponding to the first collective communication identifier.

For example, with reference to FIG. 1 and Table 1, if a second terminal device 402 sends the first packet to a first network device 100, the first destination address in the first packet is an address of a first terminal device 401, and the first collective communication identifier is 1001. A local communication group A1 corresponding to the first collective communication identifier 1001 includes the first terminal device 401 and the second terminal device 402.

Step S702: The first network device receives at least one second packet.

If a quantity of terminal devices in the local communication group corresponding to the first collective communication identifier is less than a quantity of terminal devices in a global communication group corresponding to the first collective communication identifier, the at least one second packet is one second packet, and the second packet is a packet sent by a second network device to the first network device.

For example, with reference to FIG. 2A, FIG. 2B, FIG. 3A, FIG. 3B, FIG. 4A, and FIG. 4B, in each of the embodiments shown in FIG. 2A, FIG. 2B, FIG. 3A, FIG. 3B, FIG. 4A, and FIG. 4B, the quantity of terminal devices in the local communication group corresponding to the first collective communication identifier is less than the quantity of terminal devices in the global communication group corresponding to the first collective communication identifier.

If a quantity of terminal devices in the local communication group corresponding to the first collective communication identifier is equal to a quantity of terminal devices in a global communication group corresponding to the first collective communication identifier, the at least one second packet is a packet sent by a terminal device in the local communication group corresponding to the first collective communication identifier.

For example, with reference to FIG. 5, FIG. 6, and FIG. 7, in each of the embodiments shown in FIG. 5, FIG. 6, and FIG. 7, the quantity of terminal devices in the local communication group corresponding to the first collective communication identifier is equal to the quantity of terminal devices in the global communication group corresponding to the first collective communication identifier.

Certainly, regardless of whether the at least one second packet is a packet sent by the second network device or the terminal device in the local communication group, each of the at least one second packet includes the first collective communication identifier.

Step S703: The first network device sends a third packet based on the first packet and the at least one second packet.

The third packet includes the first collective communication identifier and the first destination address.

In the embodiment shown in FIG. 8, in this embodiment of this application, when no connection is established between the first network device and the terminal device, the first network device may aggregate and distribute collective communication packets by using a connection between the first terminal device and another terminal device. Therefore, the first network device does not need to include a hardware module for establishing a connection to the terminal device, and this reduces hardware investment of the first network device. In addition, the first network device does not need to use a state machine to maintain a state of connection established between the first network device and the terminal device. This reduces resource overheads of the first network device.

Figure 9:
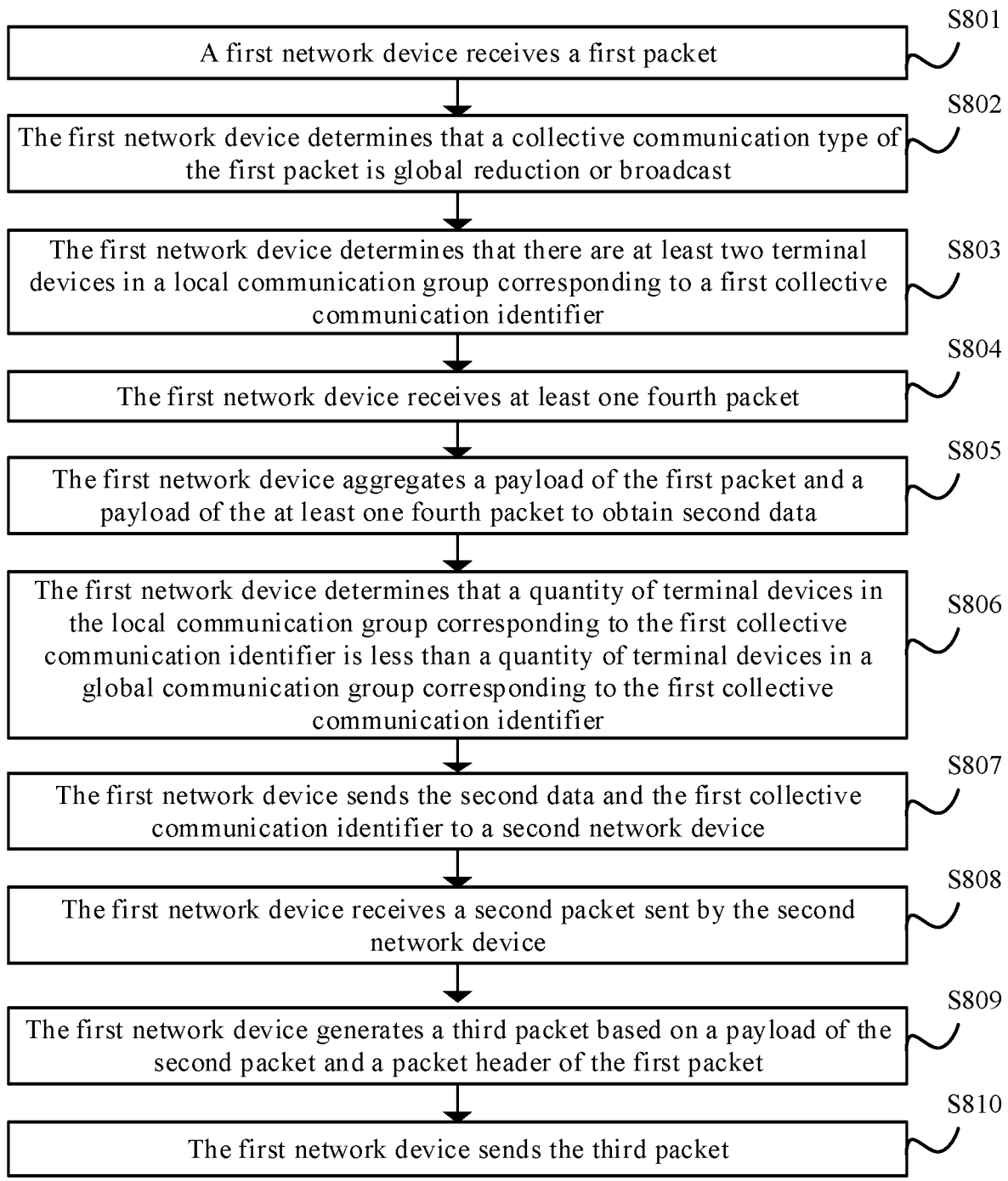
FIG. 9 is another flowchart of a collective communication method according to an embodiment of this application.

FIG. 9 is another flowchart of a collective communication method according to an embodiment of this application. The method shown in FIG. 9 includes the following steps.

Step S801: A first network device receives a first packet.

The first packet includes a first collective communication identifier and a first destination address. The first destination address is an address of a first terminal device, and the first packet is a packet sent by a terminal device in a local communication group corresponding to the first collective communication identifier.

Step S802: The first network device determines that a collective communication type of the first packet is global reduction or broadcast.

For specific implementation of step S802, refer to step S102 shown in FIG. 2A and FIG. 2B and step S202 shown in FIG. 3A and FIG. 3B.

Step S803: The first network device determines that there are at least two terminal devices in the local communication group corresponding to the first collective communication identifier.

Refer to Table 1. The first network device may learn of a quantity of terminal devices in the local communication group from the third column in Table 1. In Table 1, port numbers of child nodes corresponding to a collective communication identifier 1001 include P1 and P2. Therefore, there are two terminal devices in the local communication group.

Step S804: The first network device receives at least one fourth packet.

Each of the at least one fourth packet includes the first collective communication identifier, and the first packet and the at least one fourth packet are packets sent by all terminal devices in the local communication group corresponding to the first collective communication identifier.

Step S805: The first network device aggregates a payload of the first packet and a payload of the at least one fourth packet to obtain second data.

For specific implementation of step S805, refer to step S112 shown in FIG. 2A and FIG. 2B and step S212 shown in FIG. 3A and FIG. 3B.

Step S806: The first network device determines that the quantity of terminal devices in the local communication group corresponding to the first collective communication identifier is less than a quantity of terminal devices in a global communication group corresponding to the first collective communication identifier.

For specific implementation of step S806, refer to step S113 shown in FIG. 2A and FIG. 2B and step S213 shown in FIG. 3A and FIG. 3B.

Step S807: The first network device sends the second data and the first collective communication identifier to a second network device.

For specific implementation of step S807, refer to step S114 shown in FIG. 2A and FIG. 2B and step S214 shown in FIG. 3A and FIG. 3B.

In addition, if there is one terminal device in the local communication group corresponding to the first collective communication identifier, step S803 to step S807 may be replaced with the following three steps: The first network device determines that there is one terminal device in the local communication group corresponding to the first collective communication identifier; the first network device extracts a payload of the first packet to obtain first data; and the first network device sends the first data and the first collective communication identifier to a second network device.

Step S808: The first network device receives a second packet sent by the second network device.

The second packet includes the first collective communication identifier.

Step S809: The first network device generates a third packet based on a payload of the second packet and a packet header of the first packet.

The third packet includes the first collective communication identifier and the first destination address.

For specific implementation of step S809, refer to step S117 shown in FIG. 2A and FIG. 2B and step S217 shown in FIG. 3A and FIG. 3B.

Step S810: The first network device sends the third packet.

For specific implementation of step S810, refer to step S118 shown in FIG. 2A and FIG. 2B and step S218 shown in FIG. 3A and FIG. 3B.

In the embodiment shown in FIG. 9, in this embodiment of this application, when no connection is established between the first network device and the terminal device, the first network device may aggregate and distribute global reduction packets or broadcast packets by using a connection between the first terminal device and another terminal device. Therefore, the first network device does not need to include a hardware module for establishing a connection to the terminal device, and this reduces hardware investment of the first network device. In addition, the first network device does not need to use a state machine to maintain a state of connection established between the first network device and the terminal device. This reduces resource overheads of the first network device.

Figure 10:
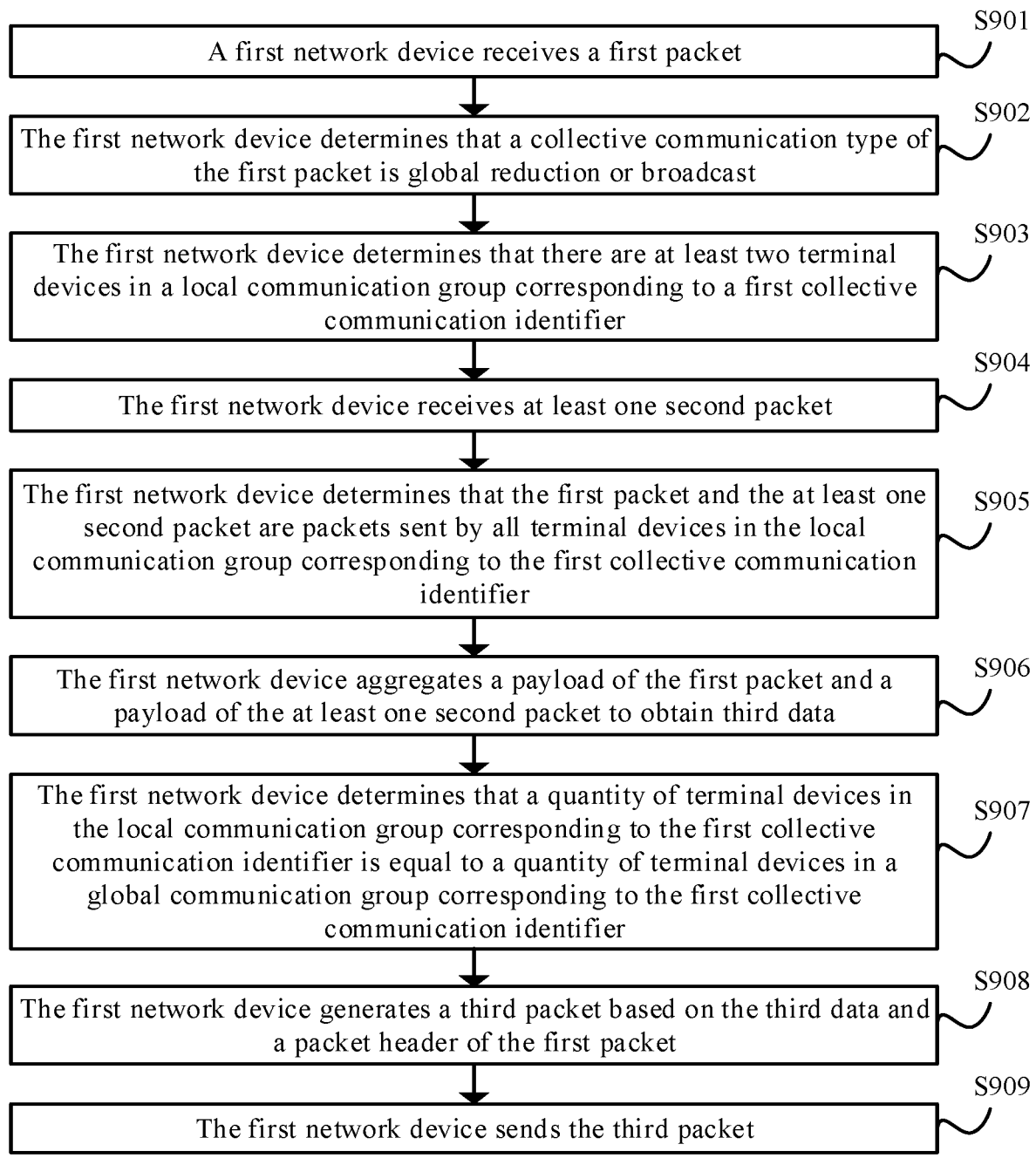
FIG. 10 is still another flowchart of a collective communication method according to an embodiment of this application.

FIG. 10 is still another flowchart of a collective communication method according to an embodiment of this application. The method shown in FIG. 10 includes the following steps.

Step S901: A first network device receives a first packet.

The first packet includes a first collective communication identifier and a first destination address. The first destination address is an address of a first terminal device, and the first packet is a packet sent by a terminal device in a local communication group corresponding to the first collective communication identifier.

Step S902: The first network device determines that a collective communication type of the first packet is global reduction or broadcast.

For specific implementation of step S902, refer to step S102 shown in FIG. 2A and FIG. 2B, step S202 shown in FIG. 3A and FIG. 3B, step S402 shown in FIG. 5, and step S502 shown in FIG. 6.

Step S903: The first network device determines that there are at least two terminal devices in the local communication group corresponding to the first collective communication identifier.

Refer to Table 1. The first network device may learn of a quantity of terminal devices in the local communication group from the third column in Table 1. In Table 1, port numbers of child nodes corresponding to a collective communication identifier 1001 include P1 and P2. Therefore, there are two terminal devices in the local communication group.

Step S904: The first network device receives at least one second packet.

Each of the at least one second packet includes the first collective communication identifier.

Step S905: The first network device determines that the first packet and the at least one second packet are packets sent by all terminal devices in the local communication group corresponding to the first collective communication identifier.

Step S906: The first network device aggregates a payload of the first packet and a payload of the at least one second packet to obtain third data.

For specific implementation of step S906, refer to step S112 shown in FIG. 2A and FIG. 2B and step S212 shown in FIG. 3A and FIG. 3B.

Step S907: The first network device determines that the quantity of terminal devices in the local communication group corresponding to the first collective communication identifier is equal to a quantity of terminal devices in a global communication group corresponding to the first collective communication identifier.

For specific implementation of step S907, refer to step S113 shown in FIG. 2A and FIG. 2B and step S213 shown in FIG. 3A and FIG. 3B.

Step S908: The first network device generates a third packet based on the third data and a packet header of the first packet.

The third packet includes the first collective communication identifier and the first destination address.

For specific implementation of step S908, refer to step S117 shown in FIG. 2A and FIG. 2B and step S217 shown in FIG. 3A and FIG. 3B.

Step S909: The first network device sends the third packet.

For specific implementation of step S909, refer to step S118 shown in FIG. 2A and FIG. 2B and step S218 shown in FIG. 3A and FIG. 3B.

In the embodiment shown in FIG. 10, in this embodiment of this application, when no connection is established between the first network device and the terminal device, the first network device may aggregate and distribute global reduction packets or broadcast packets by using a connection between the first terminal device and another terminal device. Therefore, the first network device does not need to include a hardware module for establishing a connection to the terminal device, and this reduces hardware investment of the first network device. In addition, the first network device does not need to use a state machine to maintain a state of connection established between the first network device and the terminal device. This reduces resource overheads of the first network device.

Figure 11:
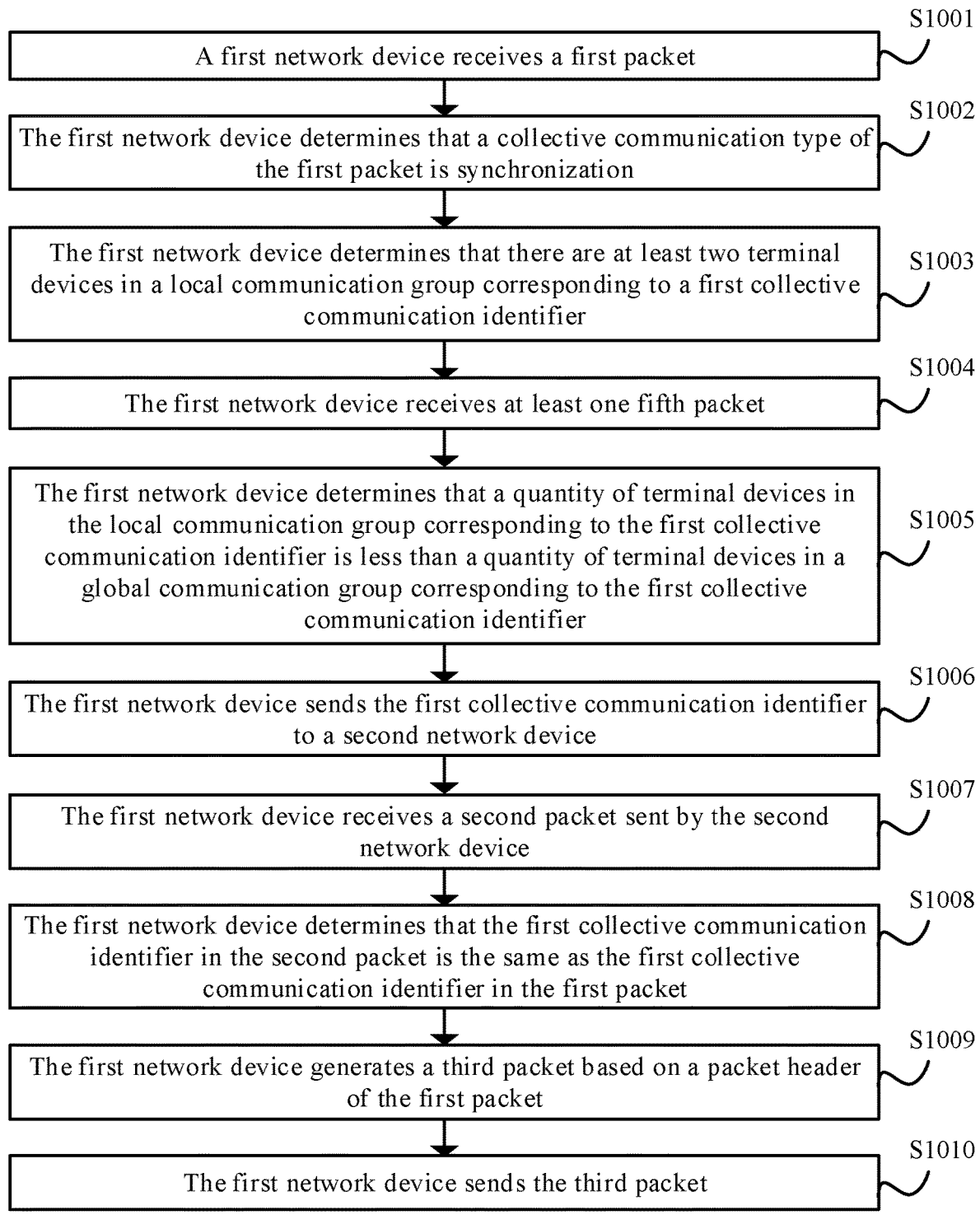
FIG. 11 is still another flowchart of a collective communication method according to an embodiment of this application.

FIG. 11 is still another flowchart of a collective communication method according to an embodiment of this application. The method shown in FIG. 11 includes the following steps.

Step S1001: A first network device receives a first packet.

The first packet includes a first collective communication identifier and a first destination address. The first destination address is an address of a first terminal device, and the first packet is a packet sent by a terminal device in a local communication group corresponding to the first collective communication identifier.

Step S1002: The first network device determines that a collective communication type of the first packet is synchronization.

For specific implementation of step S1002, refer to step S302 shown in FIG. 4A and FIG. 4B.

Step S1003: The first network device determines that there are at least two terminal devices in the local communication group corresponding to the first collective communication identifier.

Refer to Table 1. The first network device may learn of a quantity of terminal devices in the local communication group from the third column in Table 1. In Table 1, port numbers of child nodes corresponding to a collective communication identifier 1001 include P1 and P2. Therefore, there are two terminal devices in the local communication group.

Step S1004: The first network device receives at least one fifth packet.

Each of the at least one fifth packet includes the first collective communication identifier, and the first packet and the at least one fifth packet are packets sent by all terminal devices in the local communication group corresponding to the first collective communication identifier.

Step S1005: The first network device determines that the quantity of terminal devices in the local communication group corresponding to the first collective communication identifier is less than a quantity of terminal devices in a global communication group corresponding to the first collective communication identifier.

For specific implementation of step S1005, refer to step S311 shown in FIG. 4A and FIG. 4B.

Step S1006: The first network device sends the first collective communication identifier to a second network device.

For specific implementation of step S1006, refer to step S312 shown in FIG. 4A and FIG. 4B.

In addition, if there is one terminal device in the local communication group corresponding to the first collective communication identifier, step S1003 to step S1006 may be replaced with the following three steps: The first network device determines that there is one terminal device in the local communication group corresponding to the first collective communication identifier; the first network device determines that a quantity of terminal devices in the local communication group corresponding to the first collective communication identifier is less than a quantity of terminal devices in a global communication group corresponding to the first collective communication identifier; and the first network device sends the first collective communication identifier to a second network device.

Step S1007: The first network device receives a second packet sent by the second network device.

The second packet includes the first collective communication identifier.

Step S1008: The first network device determines that the first collective communication identifier in the second packet is the same as the first collective communication identifier in the first packet.

Step S1009: The first network device generates a third packet based on a packet header of the first packet.

For specific implementation of step S1009, refer to step S315 shown in FIG. 4A and FIG. 4B.

Step S1010: The first network device sends the third packet.

A payload of the third packet is the same as a payload of the first packet.

For specific implementation of step S1010, refer to step S316 shown in FIG. 4A and FIG. 4B.

In the embodiment shown in FIG. 11, in this embodiment of this application, when no connection is established between the first network device and the terminal device, the first network device may aggregate and distribute synchronization packets by using a connection between the first terminal device and another terminal device. Therefore, the first network device does not need to include a hardware module for establishing a connection to the terminal device, and this reduces hardware investment of the first network device. In addition, the first network device does not need to use a state machine to maintain a state of connection established between the first network device and the terminal device. This reduces resource overheads of the first network device.

Figure 12:
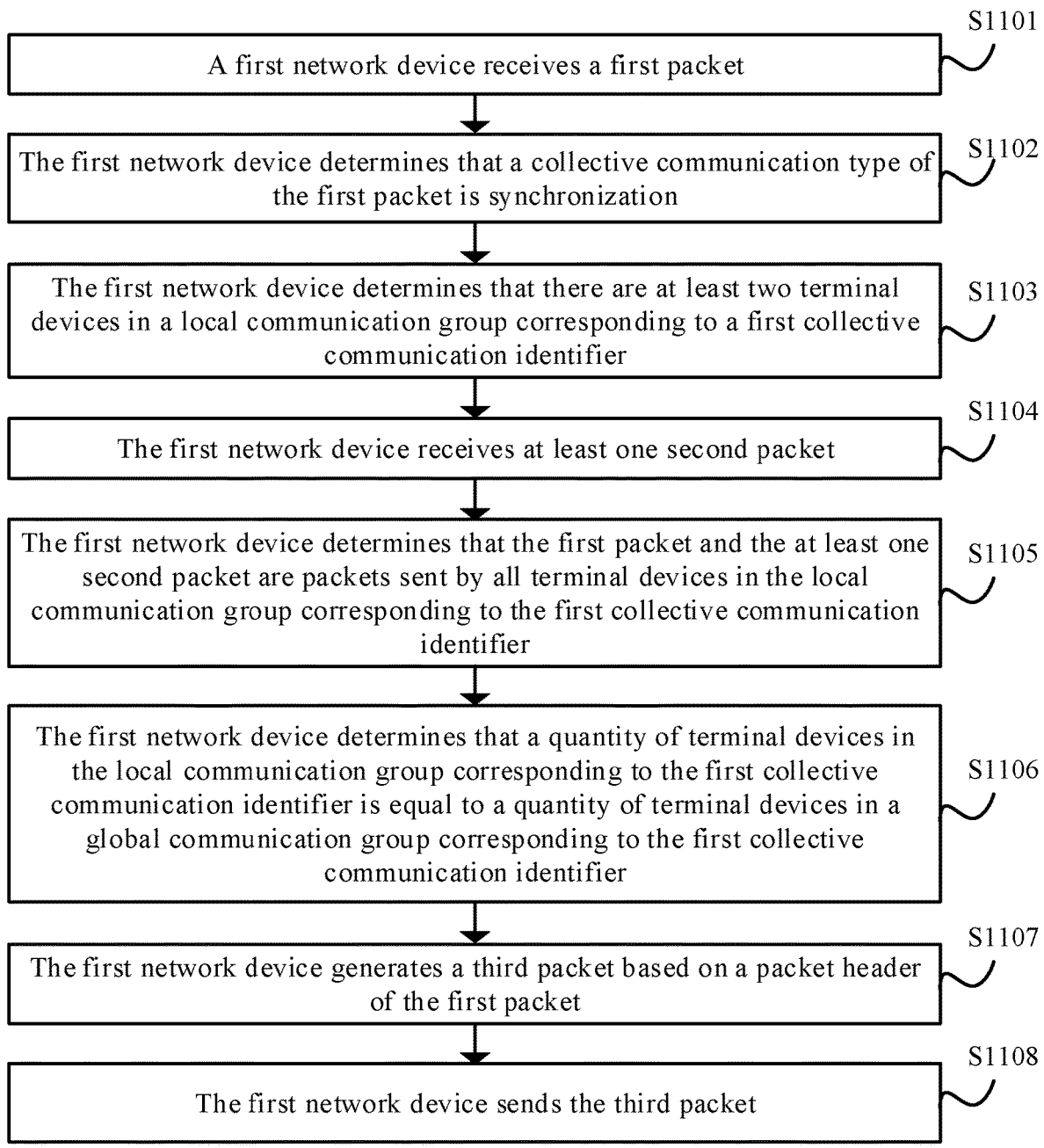
FIG. 12 is still another flowchart of a collective communication method according to an embodiment of this application.

FIG. 12 is still another flowchart of a collective communication method according to an embodiment of this application. The method shown in FIG. 12 includes the following steps.

Step S1101: A first network device receives a first packet.

The first packet includes a first collective communication identifier and a first destination address. The first destination address is an address of a first terminal device, and the first packet is a packet sent by a terminal device in a local communication group corresponding to the first collective communication identifier.

Step S1102: The first network device determines that a collective communication type of the first packet is synchronization.

For specific implementation of step S1102, refer to step S602 shown in FIG. 7.

Step S1103: The first network device determines that there are at least two terminal devices in the local communication group corresponding to the first collective communication identifier.

Refer to Table 1. The first network device may learn of a quantity of terminal devices in the local communication group from the third column in Table 1. In Table 1, port numbers of child nodes corresponding to a collective communication identifier 1001 include P1 and P2. Therefore, there are two terminal devices in the local communication group.

Step S1104: The first network device receives at least one second packet.

Each of the at least one second packet includes the first collective communication identifier.

Step S1105: The first network device determines that the first packet and the at least one second packet are packets sent by all terminal devices in the local communication group corresponding to the first collective communication identifier.

Step S1106: The first network device determines that the quantity of terminal devices in the local communication group corresponding to the first collective communication identifier is equal to a quantity of terminal devices in a global communication group corresponding to the first collective communication identifier.

For specific implementation of step S1106, refer to step S611 shown in FIG. 7.

Step S1107: The first network device generates a third packet based on a packet header of the first packet.

For specific implementation of step S1107, refer to step S612 shown in FIG. 7.

Step S1108: The first network device sends the third packet.

For specific implementation of step S1108, refer to step S613 shown in FIG. 7.

In the embodiment shown in FIG. 12, in this embodiment of this application, when no connection is established between the first network device and the terminal device, the first network device may aggregate and distribute synchronization packets by using a connection between the first terminal device and another terminal device. Therefore, the first network device does not need to include a hardware module for establishing a connection to the terminal device, and this reduces hardware investment of the first network device. In addition, the first network device does not need to use a state machine to maintain a state of connection established between the first network device and the terminal device. This reduces resource overheads of the first network device.

Figure 13:
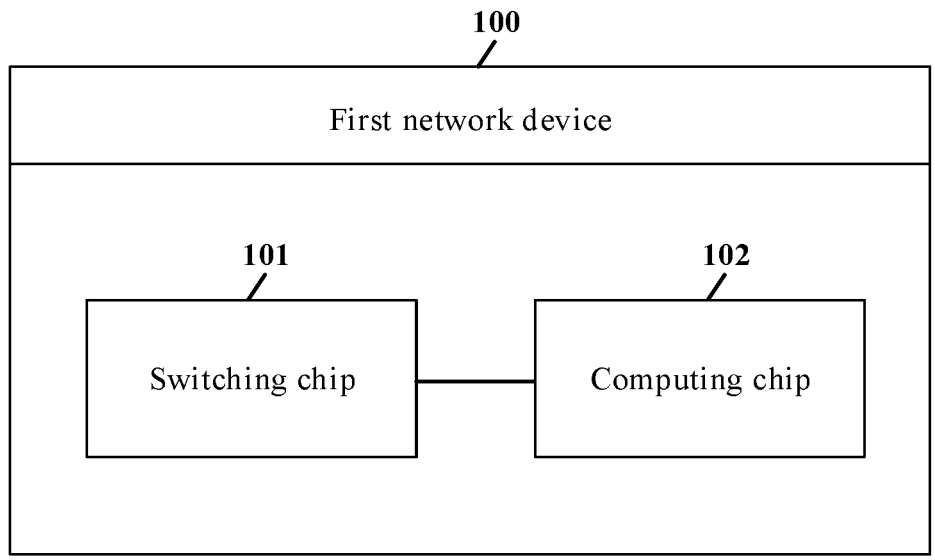
FIG. 13 is a schematic diagram of a network device according to an embodiment of this application.

FIG. 13 is a schematic diagram of a network device according to an embodiment of this application. A first network device 100 shown in FIG. 13 includes a switching chip 101 and a computing chip 102. The switching chip 101 is mainly configured to receive, send, and identify a collective communication packet. The computing chip 102 is mainly configured to store, aggregate, and process the collective communication packet. Functions of the switching chip 101 and the computing chip 102 are described below in detail with reference to FIG. 1, FIG. 2A, FIG. 2B, Table 1, and FIG. 13.

In the embodiments shown in FIG. 1, FIG. 2A, FIG. 2B, Table 1, and FIG. 13, the switching chip 101 receives a packet (X1) sent by a first terminal device 401. The switching chip 101 determines, based on a collective communication field (QJGY) of the packet (X1) and Table 2, that a collective communication type of the packet (X1) is global reduction. The switching chip 101 sends the packet (X1) to the computing chip 102. The computing chip 102 receives the packet (X1) sent by the switching chip 101. The computing chip 102 obtains a port number (P1) corresponding to a port for receiving the packet (X1). The computing chip 102 obtains a collective communication identifier (1001) in a packet header of the packet (X1). The computing chip 102 may determine, based on the collective communication identifier (1001), the port (P1), and Table 1, that the packet (X1) comes from a child node. The computing chip 102 stores the packet (X1).

In the embodiments shown in FIG. 1, FIG. 2A, FIG. 2B, Table 1, and FIG. 13, the switching chip 101 receives a packet (Y1) sent by a second terminal device 402. The switching chip 101 determines, based on a collective communication field (QJGY) of the packet (Y1) and Table 2, that a collective communication type of the packet (Y1) is global reduction. The switching chip 101 sends the packet (Y1) to the computing chip 102. The computing chip 102 obtains a port number (P2) corresponding to a port for receiving the packet (Y1). The computing chip 102 obtains a collective communication identifier (1001) in a packet header of the packet (Y1). The computing chip 102 may determine, based on the collective communication identifier (1001), the port (P2), and Table 1, that the packet (Y1) comes from a child node. The computing chip 102 stores the packet (Y1).

In the embodiments shown in FIG. 1, FIG. 2A, FIG. 2B, Table 1, and FIG. 13, after the computing chip 102 determines that the port corresponding to each of the port numbers (P1 and P2) of the child nodes receives the collective communication packet, the computing chip 102 determines that a global reduction field in each of the packet (X1) and the packet (Y1) is summation. The computing chip 102 extracts a payload (value 1) of the packet (X1) and a payload (value 5) of the packet (Y1). The computing chip 102 calculates a sum of the payload (value 1) of the packet (X1) and the payload (value 5) of the packet (Y1) to obtain data A (value 6). The computing chip 102 determines, based on Table 1, a quantity (2) of terminal devices in a local communication group (A1) corresponding to the collective communication identifier (1001). The computing chip 102 determines, based on Table 1, a quantity (4) of terminal devices in a global communication group (B1) corresponding to the collective communication identifier (1001). The computing chip 102 determines that the quantity (2) of terminal devices in the local communication group (A1) is less than the quantity (4) of terminal devices in the global communication group (B1). The computing chip 102 sends the data A (value 6) and the collective communication identifier (1001) to the switching chip 101.

In the embodiments shown in FIG. 1, FIG. 2A, FIG. 2B, Table 1, and FIG. 13, after the switching chip 101 receives the data A (value 6) and the collective communication identifier (1001) sent by the computing chip 102, the switching chip 101 sends the data A (value 6) and the collective communication identifier (1001) to a second network device 200. The switching chip 101 receives a packet (Z1) sent by the second network device 200, and the switching chip 101 sends the packet (Z1) to the computing chip 102.

In the embodiments shown in FIG. 1, FIG. 2A, FIG. 2B, Table 1, and FIG. 13, after the computing chip 102 receives the packet (Z1) sent by the switching chip 101, the computing chip 102 may determine, based on the collective communication identifier (1001) in the packet (Z1), a port (P10) for receiving the packet (Z1), and Table 1, that the packet (Z1) comes from a parent node. The computing chip 102 generates a packet (X2) based on the packet header of the packet (X1) and a payload of the packet (Z1). The computing chip 102 generates a packet (Y2) based on the packet header of the packet (Y1) and the payload of the packet (Z1). The computing chip 102 sends the packet (X2) and the packet (Y2) to the switching chip 101. After the switching chip 101 receives the packet (X2) and the packet (Y2) sent by the computing chip 102, the switching chip 101 sends the packet (X2) and the packet (Y2).

In the embodiments shown in FIG. 1, FIG. 2A, FIG. 2B, Table 1, and FIG. 13, the processes performed by the switching chip 101 and the computing chip 102 of the first network device 100 when the collective communication type of the packet is global reduction are described.

Figure 14:
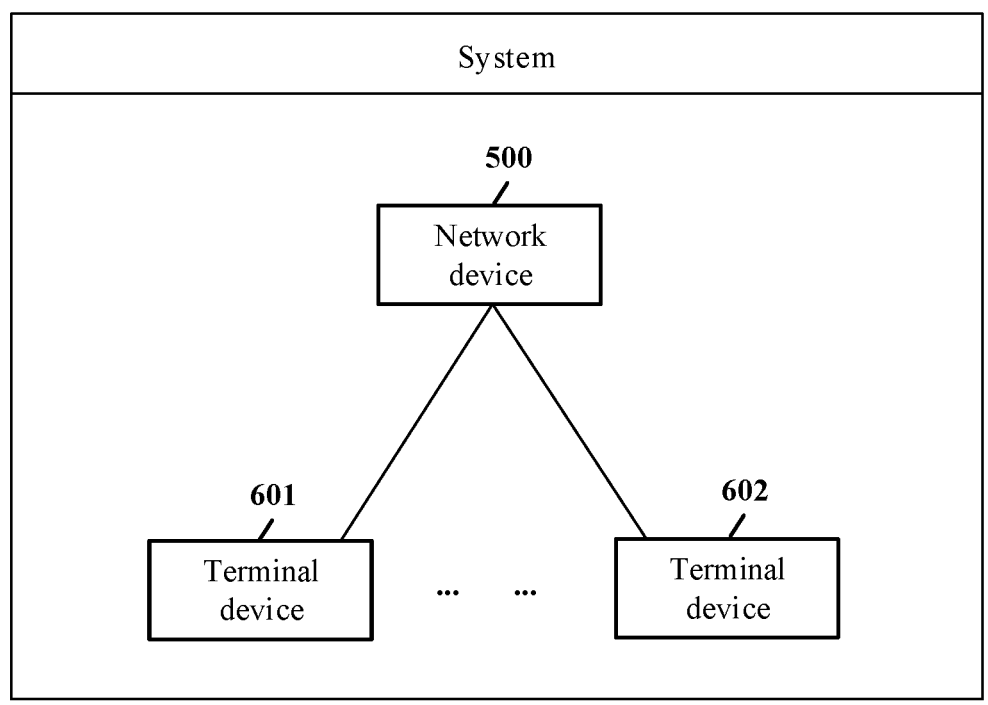
FIG. 14 is a schematic diagram of a system according to an embodiment of this application.

FIG. 14 is a schematic diagram of a system according to an embodiment of this application. The system shown in FIG. 14 includes a network device 500 and at least two terminal devices. The at least two terminal devices include devices such as a terminal device 601 and a terminal device 602.

In the embodiment shown in FIG. 14, a working principle of the network device 500 shown in FIG. 14 is the same as that of the first network device 100 in FIG. 1 to FIG. 7. For an execution process of the network device 500 shown in FIG. 14, refer to the execution process of the first network device 100 in FIG. 1 to FIG. 7. Working principles of the terminal device 601 and the terminal device 602 shown in FIG. 14 are the same as those of the first terminal device 401 and the second terminal device 402 in FIG. 1 to FIG. 7. For execution processes of the terminal device 601 and the terminal device 602 shown in FIG. 14, refer to the execution processes of the first terminal device 401 and the second terminal device 402 in FIG. 1 to FIG. 7.

In the embodiment shown in FIG. 14, in this embodiment of this application, when no connection is established between the network device 500 and each of the at least two terminals, the network device 500 may aggregate and distribute collective communication packets by using a connection between the at least two terminal devices. Therefore, the network device 500 does not need to include a hardware module for establishing a connection to each of the at least two terminal devices, thereby reducing hardware investment of the network device 500. In addition, the network device 500 does not need to use a state machine to maintain a state of connection established between the network device 500 and each of the at least two terminal devices, thereby reducing resource overheads of the network device 500.

Figure 15:
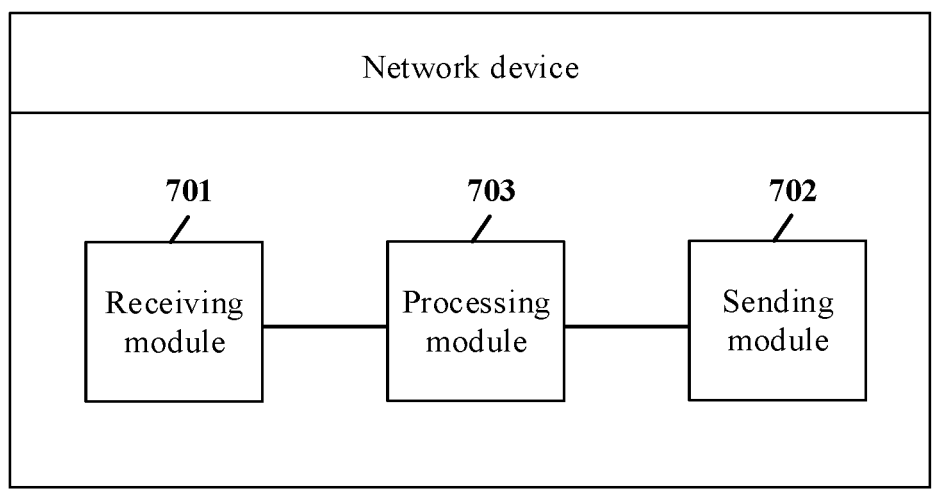
FIG. 15 is another schematic diagram of a network device according to an embodiment of this application.

FIG. 15 is another schematic diagram of a network device according to an embodiment of this application. The network device shown in FIG. 15 includes the following modules:

a receiving module 701, configured to: receive a first packet, where the first packet includes a first collective communication identifier and a first destination address, and the first destination address is an address of a first terminal device; and receive at least one second packet, where each of the at least one second packet includes the first collective communication identifier; and a sending module 702, configured to send a third packet based on the first packet and the at least one second packet, where the third packet includes the first collective communication identifier and the first destination address.

In the embodiment shown in FIG. 15, the network device further includes a processing module 703. The processing module 703 is configured to generate the third packet based on a payload of the second packet and a packet header of the first packet. The second packet is a packet sent by a second network device. The sending module 702 is configured to send the third packet.

In the embodiment shown in FIG. 15, the processing module 703 is configured to: determine that there is one terminal device in a local communication group corresponding to the first collective communication identifier; and extract a payload of the first packet to obtain first data. The sending module 702 is configured to send the first data and the first collective communication identifier to the second network device.

In the embodiment shown in FIG. 15, the processing module 703 is configured to determine that there are at least two terminal devices in a local communication group corresponding to the first collective communication identifier. The receiving module 701 is configured to receive at least one fourth packet. Each of the at least one fourth packet includes the first collective communication identifier, and the first packet and the at least one fourth packet are packets sent by all terminal devices in the local communication group corresponding to the first collective communication identifier. The processing module 703 is configured to aggregate a payload of the first packet and a payload of the at least one fourth packet to obtain second data.

The sending module 702 is configured to send the second data and the first collective communication identifier to the second network device.

In the embodiment shown in FIG. 15, the processing module 703 is configured to: determine that a collective communication type of the first packet is global reduction or broadcast; and determine that a quantity of terminal devices in the local communication group corresponding to the first collective communication identifier is less than a quantity of terminal devices in a global communication group corresponding to the first collective communication identifier.

In the embodiment shown in FIG. 15, the processing module 703 is configured to: determine that the first packet and the at least one second packet are packets sent by all terminal devices in a local communication group corresponding to the first collective communication identifier; aggregate a payload of the first packet and a payload of the at least one second packet to obtain third data; and generate the third packet based on the third data and a packet header of the first packet. The sending module 702 is configured to send the third packet.

In the embodiment shown in FIG. 15, the processing module 703 is configured to: determine that a collective communication type of the first packet is global reduction or broadcast; and determine that a quantity of terminal devices in the local communication group corresponding to the first collective communication identifier is equal to a quantity of terminal devices in a global communication group corresponding to the first collective communication identifier.

In the embodiment shown in FIG. 15, the processing module 703 is configured to determine that the first collective communication identifier in the second packet is the same as the first collective communication identifier in the first packet. The second packet is a packet sent by a second network device. The sending module 702 is configured to send the third packet. A payload of the third packet is the same as a payload of the first packet.

In the embodiment shown in FIG. 15, the processing module 703 is configured to determine that there is one terminal device in a local communication group corresponding to the first collective communication identifier. The sending module 702 is configured to send the first collective communication identifier to the second network device.

In the embodiment shown in FIG. 15, the processing module 703 is configured to determine that there are at least two terminal devices in a local communication group corresponding to the first collective communication identifier. The receiving module 701 is configured to receive at least one fifth packet. Each of the at least one fifth packet includes the first collective communication identifier, and the first packet and the at least one fifth packet are packets sent by all terminal devices in the local communication group corresponding to the first collective communication identifier. The sending module 702 is configured to send the first collective communication identifier to the second network device.

In the embodiment shown in FIG. 15, the processing module 703 is configured to: determine that a collective communication type of the first packet is synchronization; and determine that a quantity of terminal devices in the local communication group corresponding to the first collective communication identifier is less than a quantity of terminal devices in a global communication group corresponding to the first collective communication identifier.

In the embodiment shown in FIG. 15, the processing module 703 is configured to determine that the first packet and the at least one second packet are packets sent by all terminal devices in a local communication group corresponding to the first collective communication identifier. The sending module 702 is configured to send the third packet. A payload of the third packet is the same as a payload of the first packet.

In the embodiment shown in FIG. 15, the processing module 703 is configured to: determine that a collective communication type of the first packet is synchronization; and determine that a quantity of terminal devices in the local communication group corresponding to the first collective communication identifier is equal to a quantity of terminal devices in a global communication group corresponding to the first collective communication identifier.

In the embodiment shown in FIG. 15, when the processing module 703 determines that the collective communication type of the first packet is global reduction, the payload of the first packet is different from a payload of the third packet, and a check value of the first packet is different from a check value of the third packet; when the processing module 703 determines that the collective communication type of the first packet is broadcast and the first packet does not carry broadcast data, the payload of the first packet is different from a payload of the third packet, and a check value of the first packet is different from a check value of the third packet; or when the processing module 703 determines that the collective communication type of the first packet is broadcast and the first packet carries broadcast data, the payload of the first packet is the same as a payload of the third packet, and a check value of the first packet is the same as a check value of the third packet.

In the embodiment shown in FIG. 15, the processing module 703 may further include a switching chip and a computing chip. Functions of the switching chip in the processing module 703 in FIG. 15 are the same as those of the switching chip 101 in FIG. 13. Functions of the computing chip in the processing module 703 in FIG. 15 are the same as those of the computing chip 102 in FIG. 13. For specific implementation of the switching chip and the computing chip in the processing module 703 in FIG. 15, refer to the description of the switching chip 101 and the computing chip 102 in the embodiment shown in FIG. 13.

It should be noted that, when there is a function implemented by software in the foregoing embodiments, related software or a module in the software may be stored in a computer-readable medium or transmitted as one or more instructions or code in the computer-readable medium. The computer-readable medium includes a computer storage medium and a communication medium. The communication medium includes any medium that facilitates transmission of a computer program from one place to another. The storage medium may be any available medium that can be accessed by a computer. The following provides an example but does not impose a limitation: The computer-readable medium may include a RAM, a ROM, an EEPROM, a CD-ROM or another compact disc storage, a magnetic disk storage medium or another magnetic storage device, or any other medium that can carry or store expected program code in a form of instructions or a data structure and can be accessed by a computer.

In addition, the foregoing embodiments are merely intended to describe the technical solutions in this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof.

What is claimed is:

1. A collective communication method, wherein the method comprises:
   receiving, by a first network device, a first packet, wherein the first packet comprises a first collective communication identifier and a first destination address, and the first destination address is an address of a first terminal device;
   receiving, by the first network device from a second network device, at least one second packet, wherein each of the at least one second packet comprises the first collective communication identifier;
   determining, by the first network device, that a collective communication type of the first packet is global reduction or broadcast; and
   sending, by the first network device to the second network device, a third packet based on the first packet and the at least one second packet, wherein the third packet comprises the first collective communication identifier and the first destination address.

2. The collective communication method according to claim 1, wherein the at least one second packet is one second packet; and
   the sending, by the first network device, a third packet based on the first packet and the at least one second packet comprises:
   generating, by the first network device, the third packet based on a payload of the second packet and a packet header of the first packet, wherein the second packet is a packet sent by the second network device; and
   sending, by the first network device, the third packet.

3. The collective communication method according to claim 2, wherein after the receiving, by the first network device, the first packet and before the receiving, by the first network device, the at least one second packet, the method further comprises:
   determining, by the first network device, that there is one terminal device in a local communication group corresponding to the first collective communication identifier;
   extracting, by the first network device, a payload of the first packet to obtain first data; and
   sending, by the first network device, the first data and the first collective communication identifier to the second network device.

4. The collective communication method according to claim 2, wherein after the receiving, by the first network device, the first packet and before the receiving, by the first network device, the at least one second packet, the method further comprises:
   determining, by the first network device, that there are at least two terminal devices in a local communication group corresponding to the first collective communication identifier;
   receiving, by the first network device, at least one fourth packet, wherein each of the at least one fourth packet comprises the first collective communication identifier, and the first packet and the at least one fourth packet are packets sent by terminal devices in the local communication group corresponding to the first collective communication identifier;
   aggregating, by the first network device, a payload of the first packet and a payload of the at least one fourth packet to obtain second data; and
   sending, by the first network device, the second data and the first collective communication identifier to the second network device.

5. The collective communication method according to claim 3, wherein the method further comprises:
   determining, by the first network device, that a quantity of terminal devices in the local communication group corresponding to the first collective communication identifier is less than a quantity of terminal devices in a global communication group corresponding to the first collective communication identifier.

6. The collective communication method according to claim 1, wherein the sending, by the first network device, a third packet based on the first packet and the at least one second packet comprises:
   determining, by the first network device, that the first packet and the at least one second packet are packets sent by terminal devices in a local communication group corresponding to the first collective communication identifier;
   aggregating, by the first network device, a payload of the first packet and a payload of the at least one second packet to obtain third data;
   generating, by the first network device, the third packet based on the third data and a packet header of the first packet; and
   sending, by the first network device, the third packet.

7. The collective communication method according to claim 6, wherein the method further comprises:
   determining, by the first network device, that a quantity of terminal devices in the local communication group corresponding to the first collective communication identifier is equal to a quantity of terminal devices in a global communication group corresponding to the first collective communication identifier.

8. The collective communication method according to claim 1, wherein the at least one second packet is one second packet; and
   the sending, by the first network device, the third packet based on the first packet and the at least one second packet comprises:
   determining, by the first network device, that the first collective communication identifier in the second packet is the same as the first collective communication identifier in the first packet, wherein the second packet is a packet sent by the second network device; and sending, by the first network device, the third packet, wherein a payload of the third packet is the same as a payload of the first packet.

9. The collective communication method according to claim 8, wherein after the receiving, by the first network device, the first packet and before the receiving, by the first network device, the at least one second packet, the method further comprises:
determining, by the first network device, that there is one terminal device in a local communication group corresponding to the first collective communication identifier; and
sending, by the first network device, the first collective communication identifier to the second network device.

10. The collective communication method according to claim 8, wherein after the receiving, by the first network device, the first packet and before the receiving, by the first network device, the at least one second packet, the method further comprises:
determining, by the first network device, that there are at least two terminal devices in a local communication group corresponding to the first collective communication identifier;
receiving, by the first network device, at least one fifth packet, wherein each of the at least one fifth packet comprises the first collective communication identifier, and the first packet and the at least one fifth packet are packets sent by terminal devices in the local communication group corresponding to the first collective communication identifier; and
sending, by the first network device, the first collective communication identifier to the second network device.

11. A network device, comprising:
one or more processors; and
a non-transitory computer-readable memory storing a program to be executed by the one or more processors, the program including instructions that, when executed by the one or more processors, cause the network device to:
receive a first packet, wherein the first packet comprises a first collective communication identifier and a first destination address, and the first destination address is an address of a first terminal device;
determine, by the first network device, that a collective communication type of the first packet is global reduction or broadcast; and
receive at least one second packet from a second network device, wherein each of the at least one second packet comprises the first collective communication identifier; and
send, to the second network device, a third packet based on the first packet and the at least one second packet, wherein the third packet comprises the first collective communication identifier and the first destination address.

12. The network device according to claim 11, wherein the program further comprises instructions that, when executed by the one or more processors, cause the network device to: generate the third packet based on a payload of the second packet and a packet header of the first packet, wherein the second packet is a packet sent by the second network device; and
the sending module is configured to send the third packet.

13. The network device according to claim 12, wherein the program further comprises instructions that, when executed by the one or more processors, cause the network device to:
determine that there is one terminal device in a local communication group corresponding to the first collective communication identifier; and extract a payload of the first packet to obtain first data; and
the sending module is configured to send the first data and the first collective communication identifier to the second network device.

14. The network device according to claim 13, wherein the program further comprises instructions that, when executed by the one or more processors, cause the network device to: determine that a quantity of terminal devices in the local communication group corresponding to the first collective communication identifier is less than a quantity of terminal devices in a global communication group corresponding to the first collective communication identifier.

15. The network device according to claim 12, wherein the program further comprises instructions that, when executed by the one or more processors, cause the network device to: determine that there are at least two terminal devices in a local communication group corresponding to the first collective communication identifier;
receive at least one fourth packet, wherein each of the at least one fourth packet comprises the first collective communication identifier, and the first packet and the at least one fourth packet are packets sent by terminal devices in the local communication group corresponding to the first collective communication identifier;
aggregate a payload of the first packet and a payload of the at least one fourth packet to obtain second data; and
send the second data and the first collective communication identifier to the second network device.

16. The network device according to claim 11, wherein the program further comprises instructions that, when executed by the one or more processors, cause the network device to: determine that the first packet and the at least one second packet are packets sent by terminal devices in a local communication group corresponding to the first collective communication identifier;
aggregate a payload of the first packet and a payload of the at least one second packet to obtain third data; and
generate the third packet based on the third data and a packet header of the first packet; and
the sending module is configured to send the third packet.

17. The network device according to claim 16, wherein the program further comprises instructions that, when executed by the one or more processors, cause the network device to: determine that a quantity of terminal devices in the local communication group corresponding to the first collective communication identifier is equal to a quantity of terminal devices in a global communication group corresponding to the first collective communication identifier.

18. The network device according to claim 11, wherein the program further comprises instructions that, when executed by the one or more processors, cause the network device to: determine that the first collective communication identifier in the second packet is the same as the first collective communication identifier in the first packet, wherein the second packet is a packet sent by the second network device; and
send the third packet, wherein a payload of the third packet is the same as a payload of the first packet.

19. The network device according to claim 18, wherein the program further comprises instructions that, when executed by the one or more processors, cause the network device to: determine that there is one terminal device in a local communication group corresponding to the first collective communication identifier; and send the first collective communication identifier to the second network device.

20. The network device according to claim 18, wherein the program further comprises instructions that, when executed by the one or more processors, cause the network device to: determine that there are at least two terminal devices in a local communication group corresponding to the first collective communication identifier;
receive at least one fifth packet, wherein each of the at least one fifth packet comprises the first collective communication identifier, and the first packet and the at least one fifth packet are packets sent by terminal devices in the local communication group corresponding to the first collective communication identifier; and
send the first collective communication identifier to the second network device.

* * * * *